United States Patent
Keser et al.

(10) Patent No.: US 10,313,131 B2
(45) Date of Patent: Jun. 4, 2019

(54) SECURED DAISY CHAIN COMMUNICATION

(71) Applicant: Infineon Technologies AG, Neubiberg (DE)

(72) Inventors: Goran Keser, Munich (DE); Phillip Gesien, Feldkirchen (DE); Guenter Hofer, St. Oswald (AT); Marcus Janke, Munich (DE)

(73) Assignee: Infineon Technologies AG, Neubiberg (DE)

( * ) Notice: Subject to any disclaimer, the term of this patent is extended or adjusted under 35 U.S.C. 154(b) by 309 days.

(21) Appl. No.: 15/416,987

(22) Filed: Jan. 26, 2017

(65) Prior Publication Data
US 2018/0212781 A1 Jul. 26, 2018

(51) Int. Cl.
*H04L 29/06* (2006.01)
*H04L 9/32* (2006.01)
*H04W 4/48* (2018.01)

(52) U.S. Cl.
CPC .......... *H04L 9/3247* (2013.01); *H04L 9/3236* (2013.01); *H04L 63/123* (2013.01); *H04W 4/48* (2018.02)

(58) Field of Classification Search
None
See application file for complete search history.

(56) References Cited

U.S. PATENT DOCUMENTS

| | | | | |
|---|---|---|---|---|
| 6,301,658 B1* | 10/2001 | Koehler | .................. | G06F 21/33 380/255 |
| 2005/0132202 A1* | 6/2005 | Dillaway | .............. | H04L 9/0825 713/179 |
| 2008/0104666 A1* | 5/2008 | Dillaway | ............ | G06F 21/6218 726/2 |
| 2009/0307482 A1* | 12/2009 | McCann | ............... | H04L 9/3242 713/153 |
| 2014/0380031 A1* | 12/2014 | Jones | .................... | G06F 21/572 713/2 |

(Continued)

OTHER PUBLICATIONS

"Block cipher mode of operation," Wikipedia, retrieved on Oct. 26, 2016, from https://en.wikipedia.org/wiki/Block_cipher_mode_of_operation#CBC, 13 pp.

(Continued)

*Primary Examiner* — Shin-Hon (Eric) Chen
(74) *Attorney, Agent, or Firm* — Shumaker & Sieffert, P.A.

(57) ABSTRACT

An intermediate servant device connected in a daisy chain configuration with a set of devices is described. The intermediate servant device may be configured to receive, from a previous servant device of the set of servant devices, a request for data, a first response to the request for data, and authentication information for the first response to the request for data. The intermediate servant device may be further configured to generate a second response to the request for data and determine authentication information for the second response based on the authentication information for the first response, the second response, and a key assigned to the intermediate servant device. The intermediate servant device may be further configured to output at least the authentication information for the second response, the first response, and the second response.

22 Claims, 11 Drawing Sheets

(56) References Cited

U.S. PATENT DOCUMENTS

2015/0341331 A1* 11/2015 Weksler ............... H04L 63/08
                                                      726/4
2016/0212241 A1*  7/2016 Johnston ............. H04L 67/42
2017/0346639 A1* 11/2017 Muftic ............... H04L 9/3268

OTHER PUBLICATIONS

"File:CBC encryption.svg," Wikimedia.org, retrieved on May 7, 2016, from https://commons.wikimedia.org/wiki/File:CBC_encryption.svg, 2 pp.
Krawczyk, et al., "HMAC: Keyed-Hashing for Message Authentication," Network Working Group; Feb. 1997, 13 pp.
"Information technology—Security techniques—Encryption algorithms—Part 3: Block ciphers," Second Edition, Dec. 15, 2010, 86 pp.

* cited by examiner

SECURED DAISY CHAIN COMMUNICATION

TECHNICAL FIELD

This disclosure relates to serial device communication, and in particular, to daisy chain communication.

BACKGROUND

A master device (e.g., host microcontroller) and servant devices may be arranged in a daisy chain configuration to permit communication between the master device and each one of the servant device. For example, a first device at one end of the daisy chain configuration receives a request from the master device. The first servant device outputs data responsive to the request to a second servant device arranged in the daisy chain configuration. The second servant device outputs the data from the first servant device to a third servant device arranged in the daisy chain configuration, and so on until the data from the first servant device is forwarded to the master device. In this manner, the master device may communicate with each servant devices without requiring independent connections with each one of the servant devices.

SUMMARY

The disclosure describes techniques, devices, and systems for secured daisy chain communication. For example, a master device arranged in a daisy chain configuration may need to authenticate that data received is from servant devices arranged in the daisy chain configuration. However, in some instances, transmitting a signature for each servant device arranged in the daisy chain configuration may result in signature data far exceeding a size of the data being transmitted by servant devices arranged in the daisy chain configuration. For instance, a signature for each servant device arranged in a daisy chain configuration may be 32 bytes while data for each servant device arranged in the daisy chain configuration may be 8 bytes.

In accordance with one or more aspects of this disclosure, rather than relying on individually transmitted signatures for each servant device arranged in a daisy chain configuration, systems may be configured to permit a single signature to authenticate each servant device arranged in the daisy chain configuration. For example, servant devices arranged in the daisy chain configuration may be configured to determine a signature based on authentication information of a previous servant device arranged in the daisy chain configuration for output to a next servant device arranged in the daisy chain configuration. Accordingly, a master device may authenticate a servant device arranged in a daisy chain configuration while minimizing an amount of data transferred between the servant devices arranged in the daisy chain configuration.

In some examples, the disclosure is directed to an intermediate servant device connected in a daisy chain configuration with a set of devices. The intermediate servant device is configured to receive, from a previous servant device of the set of servant devices, a request for data, a first response to the request for data, and authentication information for the first response to the request for data. The intermediate servant device may be further configured to generate a second response to the request for data and determine authentication information for the second response based on the authentication information for the first response, the second response, and a key assigned to the intermediate servant device. The intermediate servant device may be further configured to output at least the authentication information for the second response, the first response, and the second response.

In some examples, the disclosure is directed to a method including receiving, by an intermediate servant device connected in a daisy chain configuration with a set of servant devices, from a previous device of the set of devices, a request for data, a first response to the request for data, and authentication information for the first response to the request for data. The method further includes generating, by the intermediate servant device, a second response to the request for data and determining, by the intermediate servant device, authentication information for the second response based on the authentication information for the first response and a key assigned to the intermediate servant device. The method further includes outputting, by the intermediate servant device, at least the authentication information for the second response, the first response, and the second response.

In some examples, the disclosure is directed to a system including a master device configured to output a request for data and a set of servant devices arranged in a daisy chain configuration such that an initial servant device of the set of servant devices receives the request for data from the master device and a last servant device of the set of servant devices outputs one or more responses to the request for data to the master device. An intermediate servant device of the set of servant devices that is arranged in the daisy chain configuration between the initial servant device and the last servant device is configured to receive, from a previous servant device of the set of servant devices, the request for data, a first response to the request for data, and authentication information for the first response and generate a second response to the request for data. The intermediate servant device is further configured to determine authentication information for the second response based on the authentication information for the first response and a key assigned to the servant device and output, to a next servant device of the set of servant devices, at least the authentication information for the second response, the first response, and the second response.

In some examples, the disclosure is directed to a master device connected to a set of servant devices that are arranged in a daisy chain configuration. The master device is configured to output, to an initial servant device of the set of servant devices, a request for data and receive, from a last servant device of the set of servant devices, a set of responses to the request for data and authentication information for a final response of the set of responses. The master device is further configured to determine, for a first response of the set of responses, authentication information for the first response based on the first response and a key assigned to a servant device of the set of servant devices that outputted the first response and determine, for each other response of the set of responses including the final response, respective authentication information based on authentication information from a previous response of the set of responses, a respective response of the set of responses, and a key assigned to a servant device of the set of servant devices that outputted the respective response to generate predicted authentication information for the final response. The mater device is further configured to authenticate the set of responses based on the predicted authentication information and the received authentication information for the final response.

In some examples, the disclosure is directed to a method including outputting, by a master device, to an initial servant device of a set of servant devices that are arranged in a daisy chain configuration, a request for data and receiving, by the master device, from a last servant device of the set of servant devices, a set of responses to the request for data and authentication information for a final response of the set of responses. The method further includes determining, by the master device, for a first response of the set of responses, authentication information for the first response based on the first response and a key assigned to a servant device of the set of servant devices that outputted the first response and determining, by the master device, for each other response of the set of responses including the final response, respective authentication information based on authentication information from a previous response of the set of responses, a respective response of the set of responses, and a key assigned to a servant device of the set of servant devices that outputted the respective response to generate predicted authentication information for the final response. The method further includes authenticating, by the master device, the set of responses based on the predicted authentication information and the received authentication information for the final response.

In some examples, the disclosure is directed to a system including a set of servant devices arranged in a daisy chain configuration; and a master device connected to the set of servant devices. The master device is configured to output, to an initial servant device of the set of servant devices, a request for data and receive, from a last servant device of the set of servant devices, a set of responses to the request for data and authentication information for a final response of the set of responses. The master device is further configured to determine, for a first response of the set of responses, authentication information for the first response based on the first response and a key assigned to a servant device that outputted the first response and determine, for each next response of the set of responses including the final response, respective authentication information based on authentication information from a previous response of the set of responses, a respective response of the set of responses, and a key assigned to a servant device of the set of servant devices that outputted the respective response to generate predicted authentication information. The master device is further configured to authenticate the set of responses based on the predicted authentication information and the received authentication information for the final response.

The details of one or more examples are set forth in the accompanying drawings and the description below. Other features, objects, and advantages of the disclosure will be apparent from the description and drawings, and from the claims.

DETAILED DESCRIPTION

Some systems may include a master device and servant devices arranged in a daisy chain configuration. For example, a system may include a master device and hundreds (e.g., 800) of servant devices arranged in a daisy chain configuration. Such systems may benefit from securing (e.g., authenticating, encrypting, etc.) responses output by the servant devices to the master device. However, without authentication, security schemes may not be effective. Accordingly, there is a need for authentication techniques suitable for use with devices arranged in a daisy configuration.

Some systems may use authentication techniques that transmit a signature for each servant device arranged in a daisy chain configuration to a master device. However, such authentication techniques may require systems to be configured for a significant amount of signature data. For instance, a 32 byte signature for each servant device arranged in a daisy chain configuration of 800 servant devices may result in over 25 kilo-bytes of signature data. In systems where a response output by each servant device is small (e.g., 1 byte), transmitting a signature for each servant device arranged in the daisy chain configuration may add significant cost to permit a communication system used by the devices arranged in the daisy chain configuration to support the signature data compared with systems that omit transmitting a signature for each servant device arranged in the daisy chain configuration.

In accordance with one or more aspects of this disclosure, rather than relying on individually transmitted signatures from each servant device arranged in a daisy chain configuration, systems may be configured to authenticate an entire set of responses to a request for data based on authentication information (e.g., a signature) for a final response. For example, servant devices may be configured to determine authentication information for a response to a request for data based on authentication information for a response from a previous servant device. In this example, a master device may calculate authentication information for each response to the request for data to generate predicted authentication information that may be compared to the received authentication information to authenticate the set of responses to the request for data. Accordingly, a master device may authenticate the set of responses to a request for data based on authentication information for a final response to the request for data to minimize an amount of data transferred between the servant devices arranged in the daisy chain configuration while providing authentication.

Figure 1:
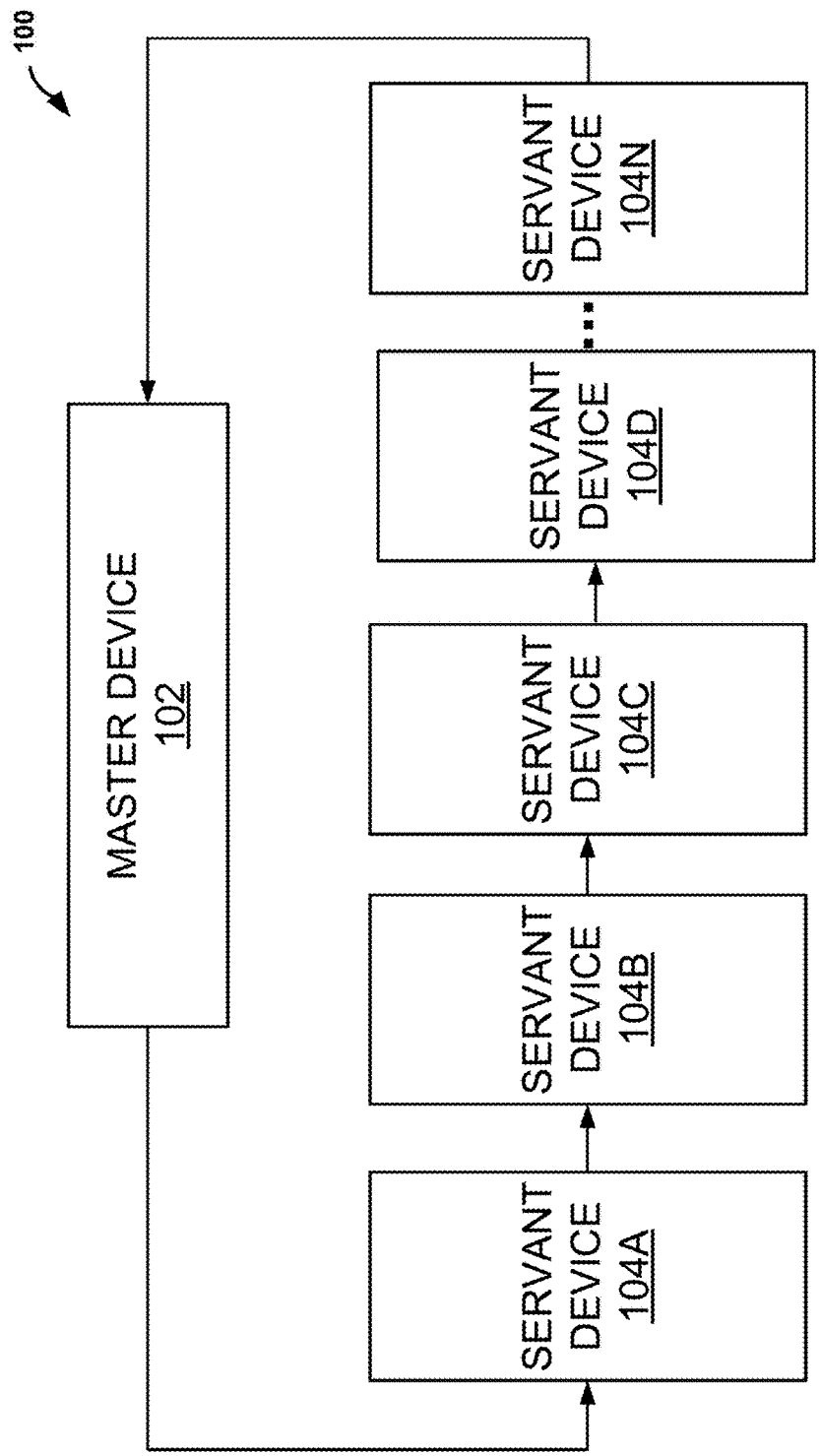
FIG. 1 is a block diagram illustrating an example system configured for secured daisy chain communication, in accordance with one or more techniques of this disclosure.

FIG. 1 is a block diagram illustrating an example system 100 configured for secured daisy chain communication, in accordance with one or more techniques of this disclosure. As shown, system 100 includes master device 102 and a set of servant devices 104A, 104B, 104C, 104D, . . . , 104N (collectively "servant devices 104"), however system 100 may include additional or fewer components.

System 100 may be configured as an automotive battery management system. For example, master device 102 may include a microcontroller for energy management. In some examples, one or more of servant devices 104 may include an energy storage device. Examples of an energy storage device may include, but are not limited to, a capacitor, a battery, or other energy storage devices. Examples of a capacitor may include may include, but are not limited to, a ceramic capacitor, a film capacitor, an electrolytic capacitor (e.g., aluminum, tantalum, niobium, or another electrolytic capacitor), a super capacitor (e.g., a double layer, a pseudocapacitor, a hybrid capacitor, or another super capacitor), a mica capacitor, or another capacitor. Examples of a battery may include, but are not limited to, disposable battery cells (e.g., alkaline, lithium, or another disposable battery cell), rechargeable battery cells (e.g., nickel-cadmium, nickel-metal hydride, lithium ion, or another rechargeable battery cell), or another battery. In any case, one or more of servant devices 104 may detect, for instance, using a sensor, a characteristic of a respective energy storage device. Examples of a characteristic of a respective energy storage device may include, but are not limited to, a temperature at an energy storage device, a voltage at an energy storage device, a current output by an energy storage device, a pressure at an energy storage device, or another characteristic of the respective energy storage device. In some examples, each servant device of servant devices 104 may include an energy storage device that may be identical to energy storage devices of other servant devices of servant devices 104. In some examples, each servant device of servant devices 104 may include an energy storage device that may be different from energy storage devices of other servant devices of servant devices 104. In some instances, servant devices of servant devices 104 may measure a same characteristic of one or more energy storage devices, while in other instances different servant devices 104 may measure different characteristics of one or more energy storage devices.

System 100 may be configured as a sensor network. For example, master device 102 may include a microcontroller for processing sensor signals and each one of servant devices 104 may include a respective sensor. Examples of sensors may include, but are not limited to, a temperature sensor, a light sensor, a pressure sensor, or another sensor configured to measure a physical quantity related to the servant devices 104. Such sensors may each measure the same quantity for all servant devices 104 or may measure different qualities. In some examples, the sensors output an indication of the measured physical quantity to a respective servant device 104 for output to master device 102. In some examples, each servant device of servant devices 104 may include a sensor that may be identical to sensors of other servant devices of servant devices 104. In some examples, each servant device of servant devices 104 may include a sensor that may be different from sensors of other servant devices of servant devices 104. In some instances, servant devices of servant devices 104 may measure a same physical quantity, while in other instances different servant devices 104 may measure different physical quantities.

System 100 may be configured as an actuator network. For example, master device 102 may include a microcontroller for processing actuator signals and each one of servant devices 104 may include a respective actuator. Examples of a characteristic of a respective actuator may include, but are not limited to, a temperature at an actuator, a voltage at an actuator, a current received by an actuator, a position of at an actuator, or another characteristic of the respective actuator. In some examples, each servant device of servant devices 104 may include an actuator that may be identical to actuators of other servant devices of servant devices 104. In some examples, each servant device of servant devices 104 may include an actuator that may be different from actuators of other servant devices of servant devices 104. In some instances, servant devices of servant devices 104 may measure a same characteristic of one or more actuators, while in other instances different servant devices 104 may measure different characteristics of one or more actuators.

Master device 102 may be configured to operate with servant devices 104 to facilitate secured daisy chain communication. During a setup procedure, master device 102 may assign a key for each of servant devices 104 that may be used to authenticate a response from an individual servant device 104A, . . . 104N. In some examples, master device 102 may output a request for data to servant device 104A and receive one or more responses to the request for data from servant device 104N. Master device 102 may include an analog circuit. In some examples, master device 102 may be a microcontroller on a single integrated circuit containing a processor core, memory, inputs, and outputs. For example, master device 102 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, master device 102 may be a combination of one or more analog components and one or more digital components.

Servant devices 104 may be configured to operate with master device 102 to facilitate secured daisy chain communication. For example, servant devices 104 may generate response to requests for data from master device 102. For instance, in an example where each servant device 104 includes a battery, master device 102 may request a battery temperature at each battery of servant devices 104. In some examples, servant devices 104 may include an analog circuit. In some examples, servant devices 104 may be a microcontroller on a single integrated circuit containing a processor core, memory, inputs, and outputs. For example, servant devices 104 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, servant devices 104 may be a combination of one or more analog components and one or more digital components.

Servant devices 104 may be arranged in a daisy chain configuration with master device 102. For instance, master device 102 and servant devices 104 may be connected in a sequence of master device 102, servant device 104A, then servant device 104B, then servant device 104C, then servant device 104D, . . . , then servant device 104N, and then master device 102. As used herein, an initial servant device may refer to a servant device of a set servant devices arranged in a daisy chain configuration that receives a request for data from a master device. For instance, servant device 102A is an initial servant device for servant devices 104. As used herein, a last servant device may refer to a servant device of a set servant devices arranged in a daisy chain configuration that outputs one or more responses to a master device. For instance, servant device 102N is a last servant device for servant devices 104.

Servant devices 104 may be configured to forward requests to a downstream servant device of servant devices 104. For example, servant devices 104 may be arranged in a daisy chain configuration such that a request for data output by master device 102 is received by servant device 104A and forwarded to downstream servant devices. For instance, servant device 104A forwards the request for data to servant device 104B, which forwards the request for data to servant device 104C, which forwards the request for data to servant device 104D, and so on until servant device 104N receives the request for data. In some examples, servant devices 104 may be arranged in a daisy chain configuration such that a response to a request for data output by servant device 104A is forwarded to downstream servant devices for output to master device 102. For instance, servant device 104A outputs a response to a request for data to servant device 104B, which forwards the response to servant device 104C, which forwards the response to servant device 104D, and so on until servant device 104N receives the request for data and outputs the response to master device 102.

Servant devices 104 may be configured to generate authentication information for a response using authentication information from a previous response. For example, servant device 104A may output, to servant device 104B, a first response to a request for data and authentication information for the first response. In this example, servant device 104B may determine authentication information for the second response based on the authentication information for the first response. As used herein, authentication information may include a signature (e.g., a hash value using a private key), a verification value (e.g., a hash value derived using a public key), other authentication information, or a combination of two or more of a signature, a verification value, and other authentication information (e.g., a signature and a verification value). For instance, servant device 104B may determine a signature using a key assigned to servant device 104B, the second response, and authentication information for the first response. In some instances, servant device 104B may determine a verification value using a public key assigned to servant device 104B, the second response, and authentication information for the first response. In this example, servant device 104B may output, to servant device 104C, the first response, a second response to the request for data, and authentication information for the second response.

Master device 102 may authenticate a set of response based on authentication information for a final response of servant devices 104. For example, using keys assigned to servant devices 104 and responses output by servant devices 104, master device 102 may generate predicted authentication information for a final output by servant device 104N. In this example, master device 102 may authenticate the set of responses output by servant devices 104 when the final authentication information output by servant device 104N for a final response generated by servant device 104N corresponds to (e.g., matches) the predicted authentication information for a final output by servant device 104N. In this manner, master device 102 may authenticate the set of responses to a request for data based on authentication information for a final response to the request for data to minimize an amount of data transferred between servant devices 104 while providing authentication.

Figure 2:
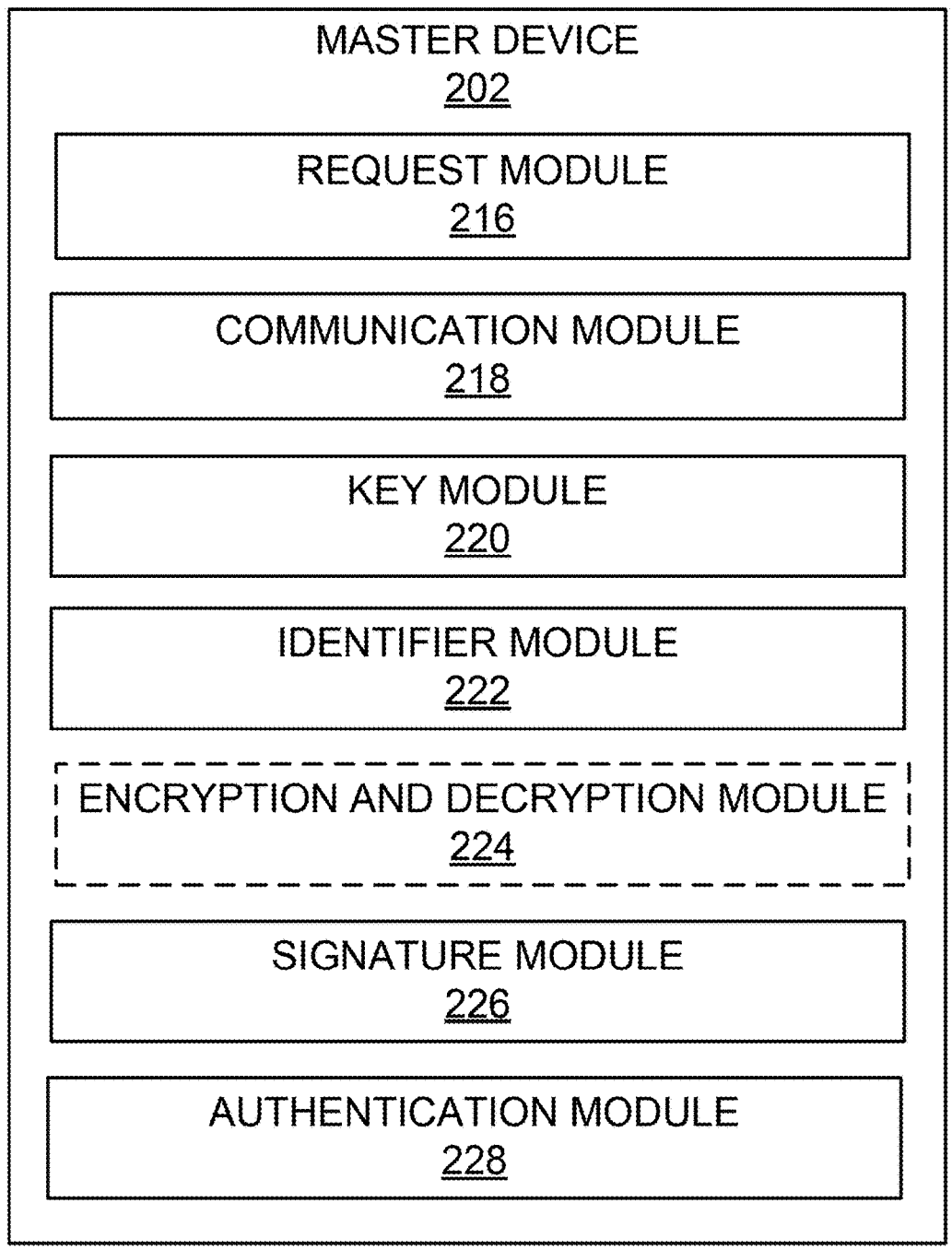
FIG. 2 is an illustration of a master device, in accordance with one or more techniques of this disclosure.

FIG. 2 is an illustration of a master device 202, in accordance with one or more techniques of this disclosure. For purposes of illustration only, master device 202 is described below within the context of system 100 of FIG. 1. Master device 202 may be an example of master device 102 of FIG. 1. As illustrated, master device 202 may include one or more of request module 216, communication module 218, key module 220, identifier module 222, encryption and encryption and decryption module 224, signature module 226, and authentication module 228. In some examples, master device 202 may omit encryption and decryption module 224. For instance, master device 202 may include one or more of request module 216, communication module 218, key module 220, identifier module 222, signature module 226, and authentication module 228. Additionally, or alternatively, master device 202 may include one or more additional key modules that are substantially similar to key module 220. For instance, master device 202 may include a second key module for another set of servant devices arranged in a daisy chain configuration. Additionally, or alternatively, master device 202 may include one or more additional identifier modules that are substantially similar to identifier module 222. For instance, master device 202 may include a second identifier module for another set of servant devices arranged in a daisy chain configuration.

Request module 216 may be configured to generate one or more requests for data. Request module 216 may request any suitable data from each of servant devices 104. For instance, request module 216 may generate a request for data that requests different data from different servant devices of servant devices 104. For instance, request module 216 may generate a request for data that requests sensor data output by a sensor of servant device 104A, a detected characteristic of an energy storage device of servant device 104B, a detected characteristic of an actuator of by servant device 104C, and so on. Additionally, or alternatively, request module 216 may generate a request for data that requests the same data from different servant devices of servant devices 104. For instance, request module 216 may generate a request for data that requests a position of an actuator of by servant device 104C, a position of an actuator of by servant device 104C, and so on. In some examples, however, request module 216 may generate a request for data that requests the same data from each of servant devices 104. For instance, request module 216 may generate a request for data that requests temperature data output by a sensor of servant device 104A, temperature data output by a sensor of servant device 104B, temperature data output by a sensor of servant device 104C, and so on. It is to be understood, that request module 216 may request data from any suitable combination of servant devices 104. For instance, request module 216 may generate a request for data that requests data from servant device 104C only.

Request module 216 may generate an unencrypted request for data for output to servant devices 104. For example, request module 216 may generate a request for data in a plain text format and communication module 218 outputs the request for data in the plain text format to servant devices 104. In this manner, the request for data may be interpreted by servant devices 104 having limited computational resources. As described further below, request module 216 may work with signature module 226 to generate a signature for the request and/or work with encryption and decryption module 224 to generate an encrypted request for data.

Request module 216 may be configured to generate a request for data such that the request for data indicates a set of addresses, where each address of the set of addresses defines one servant device of servant devices 104. For example, request module 216 may generate a request for data that includes a first address that defines servant device 104A, a second address that defines servant device 104B, and so on. The address may be a combination of alphanumeric characters, a combination of numeric characters, a network address (e.g., media access control (MAC) address, internet protocol (IP) address, or another network address), or another address.

Request module 216 may be configured to generate a request for data such that the request for data indicates a set of parameter values, wherein each respective parameter value of the set of parameter values defines whether a response is requested from a servant device of servant devices 104 assigned to the respective parameter value. For example, request module 216 may set a first parameter value of the set of parameter values to a logical '1' to indicate that a response from servant device 104A is requested. In this example, request module 216 may set a second parameter value of the set of parameter values to a logical '0' to indicate that a response from servant device 104B is not requested.

Request module 216 may be configured to generate a request for data such that the request for data indicates a set of parameter values, wherein each respective parameter value defines data requested. For examples, request module 216 may set a first parameter value of the set of parameter values to a logical '10' to indicate that a response from servant device 104A is requested that indicates a temperature at servant device 104A. In this example, request module 216 may set a second parameter value of the set of parameter values to a logical '01' to indicate that a response from servant device 104B is requested that indicates a pressure at servant device 104B. In this example, request module 216 may set a third parameter value of the set of parameter values to a logical '00' to indicate that a response from servant device 104C is not requested.

Request module 216 may be configured to generate a set of requests for data, where an order of the set of requests for data defines a servant device of servant devices 104 for each respective request for data of the set of requests for data. For example, request module 216 may output a first request to servant device 104A requesting temperature data, a second request to servant device 104A requesting pressure for data, a third request to servant device 104A requesting voltage data, and so on. In this example, servant device 104A determines that the first request for temperature data is for servant device 104A based on the first request being an initial request, servant device 104B determines that the second request for pressure data is for servant device 104B based on the second request being after the initial request, servant device 104C determines that the third request for voltage data is for servant device 104C based on the third request being after the second request, and so on.

Communication module 218 may be configured to output a request for data to servant devices 104. For example, communication module 218 may be configured to output a request to servant device 104A. For instance, communication module 218 may output a request to servant device 104A for sensor data output by a sensor of servant device 104A, a detected characteristic of an energy storage device of servant device 104B, a detected characteristic of an actuator of by servant device 104C, sensor data output by servant device 104D, . . . , and sensor data output by servant device 104N. It will be appreciated that an individual daisy chain configuration of servant devices 104 as shown in FIG. 1 is at one end connected to a communication interface of a master device, where all receiving of the master device will take place. In this example of FIG. 1 the receiving of all data sets will appear downstream of servant device 104N.

Communication module 218 may be configured to receive one or more responses to a request from a servant device of servant devices 104. For example, communication module 218 may be configured to receive one or more responses to the request for data from servant device 104N in the daisy chain configuration. For instance, communication module 218 may receive data from servant device 104N that includes sensor data output by servant device 104A, a detected characteristic of an energy storage device of servant device 104B, a detected characteristic of an actuator of by servant device 104C, sensor data output by servant device 104D, . . . , and sensor data output by servant device 104N.

Communication module 218 may be configured to receive authentication information from servant devices 104. For example, communication module 218 may be configured to receive a signature from servant device 104N. For instance, communication module 218 may receive a signature (e.g., a hash value using a private key). In some instances, communication module 218 may receive a verification value (e.g., a hash value derived using a public key). In some instances, communication module 218 may receive a signature and a verification value.

Communication module 218 may be configured to output and receive at different modes. For example, communication module 218 may be configured to receive data at a first mode and receive data at a second mode, where the first mode transfers data at a faster rate than the second mode. That is, servant devices 104 may form a first daisy chain at the first mode and form a second daisy chain at the second mode. In some examples, the first mode may utilize one or more protocols that operate faster than one or more protocols utilized in the second mode. Additionally, or alternatively, data transferred in the first mode may be prioritized over data transferred in the second mode. Additionally, or alternatively, hardware used to transfer data in the first mode may be faster (e.g., operate at a higher bandwidth, lower latency, etc.) than hardware used to transfer data in the second mode.

Communication module 218 may be configured to communicate authentication information and responses to requests at different modes. For example, communication module 218 may be configured to use a first mode for communicating responses to a request for data and a second mode for communicating authentication information, where the first mode transmits data faster than the second mode. For instance, communication module 218 may receive first mode data that includes responses to a request for data from servant device 104N at a first mode and/or output a request to servant device 104A in the first mode. It is to be understood that the first mode request to servant device 104A may initiate first mode communication across the daisy chain configuration of servant devices 104A, 104B, . . . , 104N, eventually leading to receipt of first mode data sent from servant device 104N at the master device 102. In this example, communication module 218 may receive authentication information from servant device 104N at the second mode. It is to be understood that the second mode request to servant device 104A may initiate second mode communication across the daisy chain configuration, eventually leading to receipt of second mode data sent from servant device 104N at the master device 102. In this manner, master device 102 may be configured to receive responses to a request faster than authentication information to permit master device 102 to initiate a calculation of predicted authentication information while servant devices 104 are transmitting and/or determining authentication information.

Key module 220 may determine a key for an individual servant device of servant devices 104. For example, key module 220 may receive an indication of a first key $k_A$ for servant device 104A, a second key $k_B$ for servant device 104B, a third key $k_C$ for servant device 104C, and so on. Key module 220 may associate an individual one of keys $k_A$, $k_B$, $k_C$, ..., $k_N$ with each one of servant devices 104. For instance, key module 220 may generate and/or modify a first table entry associated with servant device 104A to indicate key $k_A$, a second table entry associated with servant device 104B to indicate $k_B$, and so forth. In some examples, each key assigned to servant devices 104 may be unique. For instance, a technician may assign a unique key to each one of servant devices 104. In some instances, each servant device may generate (e.g., using a Diffie-Hellmann scheme) a key as discussed with respect to FIG. 3. In some examples, a daisy chain may be assigned a set of keys that are distributed to servant devices arranged in the daisy chain. In some examples, a daisy chain may be assigned a single key that is distributed to each of the servant devices arranged in the daisy chain.

Key module 220 may determine whether master device 202 is in a trusted environment for receiving a key for an individual servant device of servant devices 104. For example, during manufacturing or an initial setup, each of servant devices 104 may be configured with a unique key. In this example, key module 220 may determine that master device 202 is in a trusted environment for receiving keys from servant devices 104 in response to determining that master device 202 is in a start-up state with servant devices 104. It should be understood that each of servant devices 104 may be manufactured or configured during an initial setup with a permanent key or a reconfigurable key.

Key module 220 may receive a key for an individual servant device of servant devices 104 using a secure channel between the individual servant device of servant devices 104 that is established using a dedicated device. For example, in response to determining that master device 202 is in not in a trusted environment (e.g., an untrusted environment) and that a dedicated device establishes physical access between master device 202 and an individual servant device, key module 220 may receive a key for the individual servant device of servant devices 104 using the secure channel. It should be understood that key module 220 may establish the secure channel in the untrusted environment during a setup of the individual servant device with the master device 202.

Key module 220 may receive a key for an individual servant device of servant devices 104 using a secure channel between the individual servant device of servant devices 104 that is cryptographically authorized. For example, in response to determining that master device 202 is in not in a trusted environment (e.g., an untrusted environment) and an output from authentication module 228 indicating that an individual servant device is verified, key module 220 may receive a key for the individual servant device of servant devices 104 using the secure channel. For instance, the individual servant device may output a new key and a signature for the new key and authentication module 228 may verify that the new key is from the individual servant device based on the signature.

Identifier module 222 may associate an identifier with one of servant devices 104. For example, identifier module 222 may associate a first identifier with servant device 104A, a second identifier with servant device 104B, a third identifier with servant device 104C, and so on. For instance, identifier module 222 may generate and/or modify a first table entry indicating servant device 104A and the first identifier for servant device 104A, a second table entry indicating servant device 104B and the identifier key for servant device 104B, and so forth.

Master device 202 may associate an identifier with a key. For example, key module 220 and/or identifier module 222 may generate and/or modify a table that includes a first table entry indicating an identifier for servant device 104A and a first key for servant device 104A, a second table entry indicating a second identifier for servant device 104B and a second key for servant device 104B, and so forth.

Encryption and decryption module 224 may be configured to decrypt one or more responses from servant devices 104 using keys assigned to servant devices 104. For example, encryption and decryption module 224 may decrypt an encrypted response from servant device 104A using the key $k_A$ and the encrypted response from servant device 104A. In this example, encryption and decryption module 224 may calculate a plaintext for the encrypted response from servant device 104 by applying an exclusive OR logical operation (XOR) with an initialization vector and the decrypted response. As used herein an initialization vector may refer to a fixed-size input that is random or pseudorandom. For instance, an initialization vector may be a randomized 16 byte vector for AES.

Encryption and decryption module 224 may calculate a plaintext for the encrypted response from servant device 104 by applying an exclusive OR logical operation (XOR) with a response from a previous servant device. That is, an encrypted response or encrypted response from a previous device may be used instead of an initialization vector. For example, encryption and decryption module 224 may decrypt an encrypted response from servant device 104B by decrypting, using a key for servant device 104B and the encrypted response from servant device 104A. However, in this example, encryption and decryption module 224 may calculate the plaintext by applying an exclusive OR logical operation (XOR) with an encrypted response output from servant device 104A and the decrypted response output from servant device 104B. In some examples, encryption and decryption module 224 may calculate the plaintext by applying an exclusive OR logical operation (XOR) with an unencrypted response from servant device 104A and the decrypted response output from servant device 104B.

Encryption and decryption module 224 may be implemented in hardware. For instance, Encryption and decryption module 224 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, encryption and decryption module 224 may be implemented in software. For instance, encryption and decryption module 224 may be a software module executed by a processor operating at master device 202.

Encryption and decryption module 224 may be configured for symmetric algorithms. Examples of symmetric algorithms may include, but are not limited to, advanced encryption standard (AES), which is specified in ISO/IEC 18033-3, blowfish, which is specified in RFC 2104, data encryption standard (DES), Serpent, twofish, camellia, cast-128, International Data Encryption Algorithm (IDEA), RC2, RC5, RC6, SEED, which is specified in ISO/IEC 18033-3:2010, ARIA, skipjack, tiny encryption algorithm (TEA), extended TEA, and other symmetric encryption techniques. For instance, encryption and decryption module 224 may include a circuitry configured to perform AES decryption on data received from servant device 104A using a key for servant device 104A.

Encryption and decryption module 224 may be configured to execute asymmetric algorithms. Examples of asymmetric algorithms may include, but are not limited to, Rivest-Shamir-Adleman (RSA), integrated encryption scheme (IES), describe logarithm IES (DLIES), elliptic curve IES (ECIES), Efficient and Compact Subgroup Trace Representation (ECSTR, also known as XTR), and other asymmetric algorithms. For instance, encryption and decryption module 224 may include a circuitry configured to perform RSA decryption on data received from servant device 104A using a private key for master device 202.

Encryption and decryption module 224 may work with request module 216 to generate an encrypted request for data. For example, request module 216 may generate a request for data in a plain text format. In this example, encryption and decryption module 224 may generate a signature using an asymmetric or symmetric algorithm for the request for data. In this example, communication module 218 outputs the request for data in an encrypted format. It should be understood that servant device 104A may decrypt the request for data and forward the request for data in a plain text format or each of servant devices 104 may decrypt the request for data and encrypt the request for data for output. Additionally, and as discussed further below, it should be understood that signature module 226 may generate a signature for the encrypted request for data or the encrypted request for data may be output without a signature.

Signature module 226 may be configured to determine authentication information. For example, signature module 226 may be configured to determine a signature. As used herein, a signature may refer to a mathematical scheme for demonstrating the authenticity of a digital message. In some examples, signature module 226 may be configured to determine a verification value. Signature module 226 may be configured for symmetric algorithms. For instance, signature module 226 may include a circuitry configured to execute an HMAC algorithm to generate a signature using a key. Signature module 226 may be configured for asymmetric algorithms. For example, signature module 226 may include a circuitry configured to execute a DSA algorithm, ECDSA, or another asymmetric algorithm to generate a signature. Signature module 226 may be implemented in hardware. For instance, signature module 226 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, signature module 226 may be implemented in software. For instance, signature module 226 may be a software module executed by a processor operating at master device 202.

Signature module 226 may work with request module 216 to generate a signature for a request for data. For example, request module 216 may generate a request for data in a plain text format. In this example, signature module 226 may generate a signature using an asymmetric or symmetric algorithm for the request for data. In this example, communication module 218 may output the request for data in plain text format and the signature to servant device 104A. It should be understood that each of servant devices 104 may forward the request along with a signature to ensure security. In examples where the request for data may be encrypted, signature module 226 may generate a signature using an asymmetric or symmetric algorithm for the encrypted request for data. In this example, communication module 218 outputs the encrypted request for data and the signature to servant device 104A. It should be understood that each of servant devices 104 may forward the encrypted request along with a signature to ensure security.

Signature module 226 may determine a predicted signature for a final response received from servant device 104N using one or more symmetric algorithms. For example, signature module 226 may calculate a first signature for a response output by servant device 104A using a response output by servant device 104A and a key assigned to an identifier for servant device 104A. In this example, signature module 226 may calculate a second signature for a response output by servant device 104B using a response output by servant device 104B, a key assigned to an identifier for servant device 104B, and the first signature for servant device 104A. In this example, signature module 226 may, in this manner, calculate a signature for each servant device of servant devices 104 to calculate a final signature for a final response output by servant devices 104. In some examples, signature module 226 may determine the predicted signature as the calculated signature for servant device 104N. However, in other examples, signature module 226 may determine the predicted signature as the calculated signature for another one of servant devices 104 (e.g., servant device 104C).

Signature module 226 may determine a final verification value for a final response received from servant device 104N using one or more asymmetric algorithms. For example, signature module 226 may generate a first verification value for a response output by servant device 104A using the response output by servant device 104A and a public key assigned to an identifier for servant device 104A. In this example, signature module 226 may generate a second verification value for a response output by servant device 104B using the response output by servant device 104B, a key assigned to an identifier for servant device 104B, and the first verification value for servant device 104A. In this example, signature module 226 may, in this manner, generate a final verification value for a final response output by servant devices 104. In some examples, signature module 226 may determine the final verification value as the calculated verification value for servant device 104N. However, in other examples, signature module 226 may determine the final verification value as the calculated verification value for another one of servant devices 104 (e.g., servant device 104C).

Signature module 226 may determine authentication information based on identifiers received in responses output by servant devices 104. For example, signature module 226 may determine a key based on identifiers received in responses output by servant devices 104. For instance, signature module 226 may determine that a response received with an identifier assigned to servant device 104A corresponds with a key assigned to servant device 104A. In this manner, signature module 226 may permit a change in order of servant devices 104. For example, one or more techniques described herein may permit servant devices 104 to be rearranged into a sequence including servant device 104B, followed by servant device 104A, servant device 104C, servant device 104D, . . . , followed by servant device 104N rather than a sequence including servant device 104A, followed by servant device 104B, servant device 104C, servant device 104D, . . . , followed by servant device 104N.

Authentication module 228 may be configured to authenticate one or more responses output by servant devices 104. As used herein, to authenticate a response may refer to instances where an identity of a servant device that output and/or generated the response is confirmed. It should be understood that authenticating a single response of a set of responses may authenticate the set of responses. For example, master device 102 may receive a set of responses output by servant devices 104A-N and a single signature for a final response of the set of responses. In this example, in response to determining that the single signature authenticates the final response, authentication module 228 authenticates each response of the one or more responses output by servant devices 104A-N. It should be understood that, in some examples, a last servant device may not output a final response. For example, servant device 104N may forward a final response generated by servant device 104D and a signature for the final response generated by servant device 104D. In this example, in response to determining that a signature for the final response authenticates the final response, authentication module 228 authenticates each response of the one or more responses output by servant devices 104A-D.

Authentication module 228 may be configured to authenticate one or more responses using one or more symmetric algorithms. For example, authentication module 228 may authenticate a set of received responses based on a comparison of a predicted signature output by signature module 226 and the signature received from servant device 104N. In this example, in response to determining that the predicted signature corresponds to (e.g., matches) the signature received from servant device 104N, authentication module 228 may authenticate the set of responses output by servant devices 104. For instance, in response to determining that the predicted signature corresponds to (e.g., matches) the signature received from servant device 104N, authentication module 228 may authenticate the entire set of responses that were output by servant devices 104A, 104B, 104C, . . . , and 104N.

Authentication module 228 may be configured to authenticate one or more responses using one or more asymmetric algorithms. For example, authentication module 228 may calculate a hash value for a signature received from servant device 104N and the public key for servant device 104N. In this example, in response to determining that a final verification value output by signature module 226 corresponds to (e.g., matches) the hash value for the signature received from servant device 104N, authentication module 228 may authenticate the set of responses output by servant device 104N. For instance, in response to determining that the final verification value output by signature module 226 corresponds to (e.g., matches) the hash value for the signature received from servant device 104N, authentication module 228 may authenticate the entire set of responses that were output by servant devices 104A, 104B, 104C, . . . , and 104N.

Authentication module 228 may be configured to authenticate one or more responses based on a verification value received from servant device 104N. In this example, in response to determining that the final verification value output by signature module 226 corresponds to (e.g., matches) the verification value received from servant device 104N, authentication module 228 may authenticate the set of responses output by servant device 104N. For instance, in response to determining that the final verification value output by signature module 226 corresponds to (e.g., matches) the verification value received from servant device 104N, authentication module 228 may authenticate the entire set of responses that were output by servant devices 104A, 104B, 104C, . . . , and 104N.

In operation, master device 202 may enroll one or more of servant devices 104. For instance, identifier module 222 may assign an identifier to servant device 104A and key module 220 may associate a key output by servant device 104A to the identifier for servant device 104A.

Master device 202 may output, to an initial servant device of servant devices 104, a request for data. For instance, master device 202 outputs, to servant device 104A, a request for data. Master device 202 may receive, from a last servant device of servant devices 104, a set of responses to the request for data and authentication information for a final response of the set of responses. For instance, master device 202 may receive, from servant device 104N, a first response outputted by servant device 104A and a second response outputted by servant device 104B. In instances where data encryption is used and in response to determining that the first response output by servant device 104A includes the identifier for servant device 104A, encryption and decryption module 224 may decrypt the first response using key $k_A$ assigned to the identifier for servant device 104A and decrypt the second response using key $k_B$ assigned to the identifier for servant device 104B.

Signature module 226 may determine, for a first response of the set of responses, authentication information for the first response based on the first response and a key assigned to a servant device that outputted the first response. In examples where a symmetric algorithm is used, signature module 226 may calculate a first signature for the first response outputted by servant device 104A using the first response and the key $k_A$. In examples where an asymmetric algorithm is used, signature module 226 may calculate a first verification value for the first response outputted by servant device 104A using the first response and a public key $k_A$.

Signature module 226 may determine, for each next response of the set of responses including the final response, respective authentication information based on authentication information from a previous response of the set of responses, a respective response of the set of responses, and a key assigned to a servant device of the set of servant devices that outputted the respective response to generate predicted authentication information for the final response. In examples where a symmetric algorithm is used, signature module 226 may calculate a second signature for servant device 104B using the calculated first signature, the key $k_B$ assigned to servant device 104B, and the first signature for the first response to generate a predicted signature for the final response. In this example, the final response is outputted by servant device 104B, however, in other examples, the final response may be outputted by one of servant devices 104C-N.

In examples where an asymmetric algorithm is used, signature module 226 may calculate a second verification value for servant device 104B using the calculated first signature, the public key $k_B$ assigned to servant device 104B, and the first verification value for the first response to generate a predicted verification value for the final response. In this example, the final response is outputted by servant device 104B, however, in other examples, the final response may be outputted by one of servant devices 104C-N.

Authentication module 228 may authenticate the set of responses based on the predicted authentication information and the received authentication information for the final response. In examples where a symmetric algorithm is used, the received authentication information may include a single signature for the final response. In this example, authentication module 228 may authenticate the set of responses when the predicted signature corresponds to (e.g., matches) the single signature for the final response.

In examples where an asymmetric algorithm is used, the received authentication information may include a single verification value for the final response. In this example, authentication module 228 may generate a hash value using the single signature for the final response and a public key assigned to a servant device of servant devices 104 that outputted the final response. For instance, authentication module 228 may generate a hash value using the single signature for the final response and a public key $k_B$ assigned to servant device 104B. In this example, authentication module 228 may authenticate the set of responses when the when the predicted verification value corresponds to (e.g., matches) the hash value.

Figure 3:
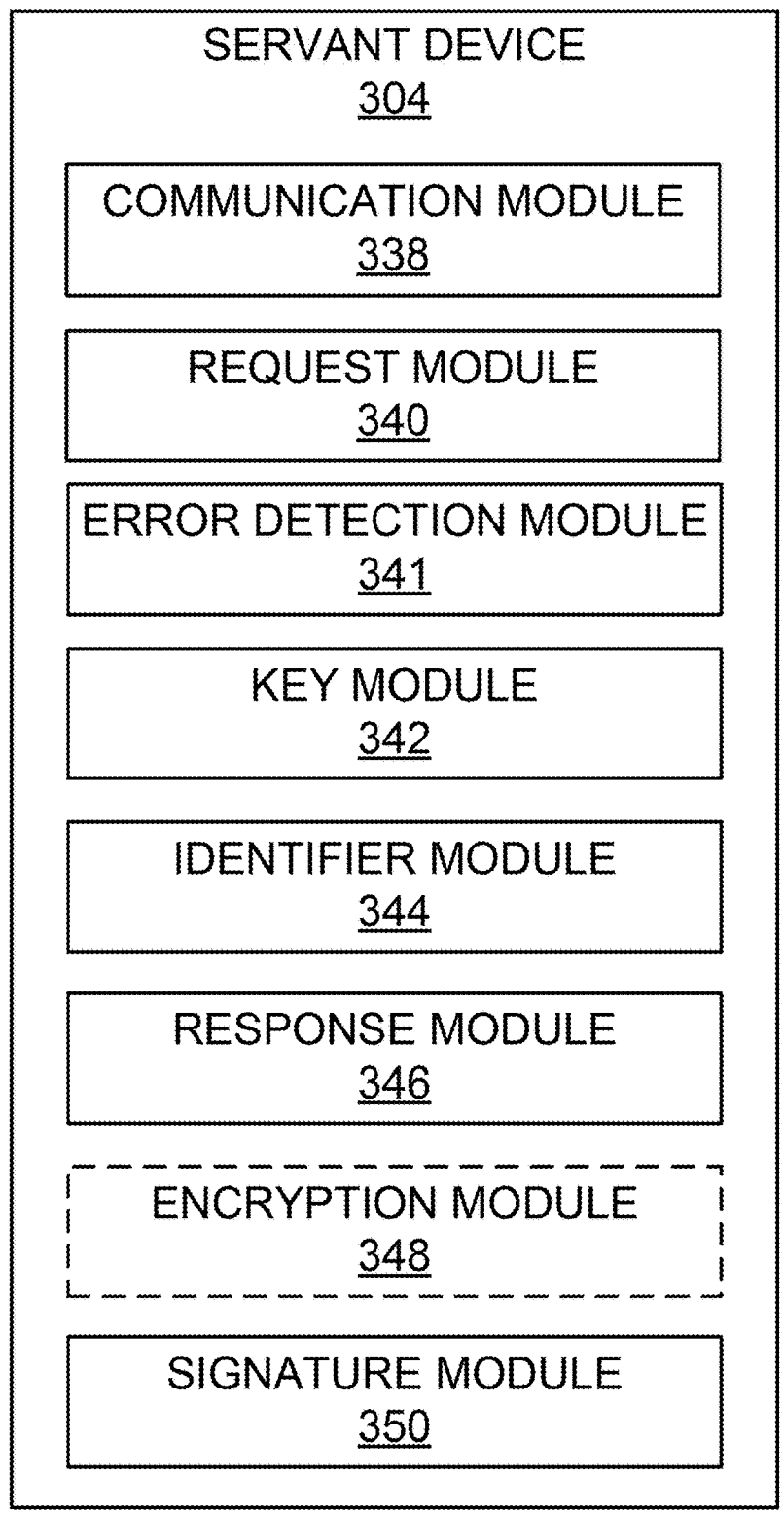
FIG. 3 is an illustration of a servant device, in accordance with one or more techniques of this disclosure.

FIG. 3 is an illustration of a servant device 304, in accordance with one or more techniques of this disclosure. For purposes of illustration only, servant device 304 is described below within the context of system 100 of FIG. 1. Although servant device 304 may be referred to as an example of servant device 104C, servant device 304 may be an example of any combination of servant devices 104 of FIG. 1. As illustrated, servant device 304 may include one or more of communication module 338, request module 340, error detection module 341, key module 342, identifier module 344, response module 346, encryption module 348, and signature module 350. In some examples, servant device 304 may omit encryption module 348. For instance, servant device 304 may include one or more of communication module 338, request module 340, error detection module 341, key module 342, identifier module 344, response module 346, and signature module 350.

Communication module 338 may be configured to receive a request for data, via servant devices 104, from master device 102. For example, master device 102 may output a request for data to servant device 104A, which may forward the request for data to servant device 104B, which may forward the request for data to communication module 338. As discussed below, in some instances, request module 340 may determine that the request for data is satisfied and may refrain from forwarding the request for data to a next servant device of servant devices 104.

Communication module 338 may be configured to receive one or more responses from a previous servant device of servant devices 104. For example, communication module 338 may be configured to receive one or more previous responses from servant device 104B. For instance, communication module 338 may receive data from servant device 104B that includes a first response generated by servant device 104A and a second response generated by servant device 104B. Similarly, communication module 338 may be configured to output one or more responses to a next servant device of servant devices 104. For example, communication module 338 may be configured to forward one or more response to servant device 104D. For instance, communication module 338 may forward to servant device 104D the first response generated by servant device 104A, the second response generated by servant device 104B, and a third response generated by servant device 304. In the above example, communication module 338 forwards responses from each of the previous servant devices 104A and B. However, as discussed further below, in other examples, communication module 338 may forward responses from a sub-set of the previous servant devices 104A and B. For instance, communication module 338 may receive, from servant device 104B, and forward, to servant device 104D, a response from only servant device 104A, a response from only servant device 104B, a response from only servant device, responses from only servant devices 104A-B, responses from only servant devices 104B-C, or responses from only servant devices 104A and C.

Communication module 338 may be configured to receive authentication information from a previous servant device. For example, communication module 338 may be configured to receive authentication information from servant device 104B. For instance, communication module 338 may receive, from servant device 104B, a single signature that servant device 104B determined using a signature output by servant device 104A. In some instances, communication module 338 may receive, from servant device 104B, a verification value for servant device 104B and a single signature that servant device 104B determined using a verification value for servant device 104A. Similarly, communication module 338 may be configured to output a signature to servant device 104D. For instance, communication module 338 may output, to servant device 104D, a single signature that servant device 304 determined using a signature output by servant device 104B. In some instances, communication module 338 may output, to servant device 104D, a verification value for servant device 304 and a single signature that servant device 304 determined using a verification value for servant device 104B.

Communication module 338 may be configured to use a first mode for communicating data and a second mode for communicating signatures. For example, communication module 338 may receive one or more responses from servant device 104B at a first mode and output one or more response to servant device 104D at the first mode. In this example, communication module 338 may receive authentication information from servant device 104B at a second mode and output authentication information to servant device 104D at the second mode. In this example, the first mode may be different than the second mode. For instance, the first mode may transmit information faster than the second mode. In some examples, different modes may operate using different hardware devices. For instance, the first mode may operate on hardware having a higher bandwidth, lower latency, etc., than the second mode.

Communication module 338 may be configured to determine whether servant device 304 is a last servant device arranged in a daisy chain. For example, communication module 338 may output, to a next servant device, a request to respond if present. In this example, in response to receiving a reply that a next servant device is present, communication module 338 may determine that servant device 304 is not a last servant device arranged in the daisy chain. In response, however, to not receiving a reply that a next servant device is present within a predetermined time, communication module 338 may determine that servant device 304 is a last servant device arranged in the daisy chain.

Request module 340 may be configured to determine whether a request for data requests a response from servant device 304 based on an address indicated in the request for data. For example, request module 340 may determine that the request for data requests a response from servant device 304 when the request indicates an address assigned to servant device 304. Such an address may be assigned by master device 102. As previously noted, the address may be a combination of alpha-numeric characters, a combination of numeric characters, a network address (e.g., media access control (MAC) address, internet protocol (IP) address, or another network address), or another address.

Request module 340 may be configured to determine whether a request for data requests a response from servant device 304 based on a parameter value indicated in the request for data. For example, request module 340 may determine that the request for data requests data from servant device 304 when the request for data indicates, at a parameter value assigned to servant device 304, a value defining a request for data. For instance, request module 340 may determine that the request for data requests a response from servant device 304 when the request for data indicates at a parameter value assigned to servant device 304 a logical '1'. In another instance, request module 340 may determine that the request for data requests a response from servant device 304 when the request for data indicates at a parameter value assigned to servant device 304 a logical '0'. Although in the above examples, the value to indicate that a response from servant device 104A is requested is a single digit, in other examples, the value may be a plurality of bits. For instance, the value '01' may indicate a request for response from a first sensor of servant device 304 while the value '10' may indicate a request for response from a second sensor of servant device 304.

Request module 340 may be configured to determine whether a request for data requests a response from servant device 304 based on an order of a request within a set of requests for data. For example, request module 340 may monitor a quantity of requests for data received and forwarded. For instance, master device 102 may define an ordered position assigned to servant device 304 as third. As such, request module 340 may determine that a first and second request do not request a response from servant device 304 and may determine that a third request requests a response from servant device 304.

Request module 340 may be configured to determine whether to forward a request for data to a next or subsequent servant devices. For example, request module 340 may determine whether the request includes one or more addresses assigned to a next or subsequent servant devices. In instances where the request lists addresses in order of servant devices, request module 340 may determine to forward the request for data in response to determining that the address assigned to servant device 304 is a not last address in the request. In response however, to determining that the address assigned to servant device 304 is a last address in the request, request module 340 may determine to refrain from forwarding the request for data.

Request module 340 may determine whether the request includes parameters defining a request for data from a next or subsequent servant devices. For example, in response to determining that parameter values of a request for data assigned to a next or subsequent servant devices include one or more values indicating that a response is requested (e.g., a value '1', value '10', etc.), request module 340 may determine to forward the request for data. In response, however, to determining that the parameter values of a request for data assigned to a next or subsequent servant devices include only values indicating that no response is requested (e.g., a value '0', value '00', etc.), request module 340 may determine to refrain from forwarding the request for data.

Request module 340 may determine to forward the request for data based on an order of a request for data. For example, request module 340 may determine to forward the request for data in response to determining that an ordered position of the request does not match the ordered position assigned to servant device 304. In response, however, to determining that an ordered position of the request does match the ordered position assigned to servant device 304, request module 340 may refrain from forwarding the request for data.

Error detection module 341 may initiate an error handling process. As used herein an error handling process may include, but is not limited to, outputting an error message to master device 102. For example, error detection module 341 may initiate an error handling process in response to determining that an energy storage device of servant device 304 is not used with full performance. In another example, error detection module 341 may work with request module 340 to determine whether to initiate an error handling process based on a state of servant device 304. For instance, in response to error detection module 341 determining that servant device 304 is in an off state and/or bypassed and request module 340 determining that a response is requested from servant device 304, error detection module 341 may initiate an error handling process.

Error detection module 341 may work with request module 340 to determine whether to initiate an error handling process based on a request for data. For example, in response to error detection module 341 determining that servant device 304 includes a sensor and does not include an energy storage device and request module 340 determining that a response is requested from servant device 304 that indicates a voltage at a battery, error detection module 341 may initiate an error handling process.

Key module 342 may be configured to store a key for servant device 304. In some examples, key module 342 may be configured to store a key for servant device 304. For example, a technician may configure key module 342 with a predetermined key. In some examples, key module 342 may generate a random key using Diffie-Hellmann. In this example, key module 342 may output the random key with master device 102. In some examples, key module 342 may receive a key. For instance, key module 342 may be pre-configured with a key. It should be understood that a key may be permanent or reconfigurable.

Key module 342 may be configured to use a reconfigurable key having a limited lifetime (e.g., session key). For example, key module 342 and master device 102 may initiate a key transfer to update a reconfigurable key. For instance, prior to a reconfigurable key expiring, key module 342 and master device 102 may establish a secure connection using an old key for communicating an updated key. In another instance, a dedicated device for physical access to master device 102 may establish a secure channel for communicating an updated key.

Identifier module 344 may associate an identifier with servant device 304. For example, identifier module 344 may associate an identifier with servant device 304 that was output by master device 102. Identifier module 344 may be configured to output an indication of an identifier output by identifier module 344. For example, identifier module 344 may append an identifier output to data (e.g., battery characteristics, sensed characteristics, etc.) generated by response module 346. In this manner, master device 102 may associate the data with servant device 304 according to the identifier appended to the data.

Response module 346 may be configured to generate a response for output by servant device 304. For example, servant device 304 may include a battery cell. In this example, response module 346 may generate a response indicating one or more detected characteristics for the battery cell. Examples of detected characteristics for a battery cell may include, but are not limited to, a voltage, temperature, current, charge level, or other detected characteristics for a battery. For instance, response module 346 may generate a response indicating a voltage of the battery cell included in servant device 304. In other examples, servant device 304 may include other devices and/or generate data differently. For instance, response module 346 may generate a response indicating a sensed lighting level. It should be understood that response module 346 may be different for different servant devices 104. For instance, servant device 104A may include a response module configured to generate a response indicating a lighting level and servant device 104B may include a response module configured to generate a response indicating a voltage. In some examples, servant device 304 may include a sensor for a sensor network. For instance, response module 346 may generate a response indicating one or more generated values for a sensor. Examples, of generated values for a sensor may include, but are not limited to, a pressure, temperature, current, voltage, vibration, capacitance, conductance, inductance, infrared, optical, ultrasonic, touch, proximity, smoke, gas, acoustic, and other generated values for the sensor. In some examples, response module 346 may generate a response indicating one or more detected characteristics for an actuator. Examples, of detected characteristics for an actuator may include, but are not limited to, a position of the actuator, a velocity of the actuator, an acceleration of the actuator, a force output by an actuator, and other generated values for the actuator.

Encryption module 348 may encrypt a response output by response module 346. Encryption module 348 may be configured for symmetric algorithms. For instance, encryption module 348 may include a circuitry configured to perform AES encryption on data using a key for servant device 304. Encryption module 348 may be configured for asymmetric algorithms. For instance, encryption module 348 may include a circuitry configured to perform RSA encryption on data using a public key. Encryption module 348 may be implemented in hardware. For instance, encryption module 348 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, encryption module 348 may be implemented in software. For instance, encryption module 348 may be a software module executed by a processor operating at servant device 304.

Encryption module 348 may be configured to use an initialization vector. For example, encryption module 348 may generate a vector for use by encryption module 348. For instance, encryption module 348 may generate a pseudorandom vector for use by encryption module 348. In some examples, encryption module 348 may generate a random vector for use by encryption module 348. In some examples, encryption module 348 may receive an initialization vector (e.g., from a previous servant device) and append the initialization vector to data generated by response module 346.

Encryption module 348 may encrypt a response output by response module 346 based on a key output by key module 342 and an initialization vector. For example, encryption module 348 may apply an exclusive OR logical operation with the response output by response module 346 and the initialization vector. In this example, encryption module 348 may encrypt, using the key output by key module 342, the result of the exclusive OR logical operation.

Encryption module 348 may encrypt a response output by response module 346 based on a key output by key module 342 and a response output by another servant device 104. For example, encryption module 348 may apply an exclusive OR logical operation with the response output by response module 346 and a response output by servant device 104B. In this example, encryption module 348 may encrypt, using the key output by key module 342, the result of the exclusive OR logical operation.

Signature module 350 may determine a signature for servant device 304. Signature module 350 may be configured for symmetric algorithms. For example, signature module 350 may include a circuitry configured to execute an HMAC algorithm to generate a signature for servant device 304 using a key for servant device 304 and master device 102 may use the key for servant device 304 to authenticate servant device 304. Signature module 350 may be configured for asymmetric algorithms. For instance, signature module 350 may include a circuitry configured to execute a DSA algorithm to generate a signature for servant device 304 using a key for servant device 304 and master device 102 may use a public key to authenticate servant device 304. Signature module 350 may be implemented in hardware. For instance, signature module 350 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, signature module 350 may be implemented in software. For instance, signature module 350 may be a software module executed by a processor operating at servant device 304.

Signature module 350 may determine a signature for servant device 304 based on a key output by key module 342 and a response output by response module 346. For example, in instances where servant device 304 is an initial servant device arranged in a daisy chain and/or a servant device that is outputting a first response to a request for data, signature module 350 may determine a signature for servant device 304 based on a key output by key module 342 and a response output by response module 346. For instance, signature module 350 may apply a symmetric algorithm using the key output by key module 342 and the response output by response module 346. In some instances, signature module 350 may apply an asymmetric algorithm using the key output by key module 342 and the response output by response module 346. It should be understood that the response output by response module 346 may be unencrypted (e.g., plaintext) or encrypted by encryption module 348.

Signature module 350 may determine a signature for servant device 304 based on a key output by key module 342, a response output by response module 346, and a signature output by a previous servant device. For example, in instances where servant device 304 is an intermediate or last servant device and/or outputting a second or subsequent response to a request for data, signature module 350 may determine a signature for servant device 304 based on a key output by key module 342, a response output by response module 346, and a signature output by a previous servant device. For instance, signature module 350 may apply a symmetric algorithm using the key output by key module 342, the response output by response module 346, and the signature output by a previous servant device. More specifically, signature module 350 may append the signature output by a previous servant device to the response output by response module 346 and apply the symmetric algorithm to the combination of the signature output by a previous servant device to the response output by response module 346 using the key output by key module 342. It should be understood that the response output by response module 346 may be unencrypted (e.g., plaintext) or encrypted by encryption module 348 and/or the response received from the previous servant device may be unencrypted (e.g., plaintext) or encrypted.

Signature module 350 may determine a signature for servant device 304 based on a private key output by key module 342, a response output by response module 346, and a verification value output by a previous servant device. For example, in instances where servant device 304 is an intermediate or last servant device and/or outputting a second or subsequent response to a request for data, signature module 350 may determine a signature for servant device 304 based on a private key output by key module 342, a response output by response module 346, and a verification value output by a previous servant device. For instance, signature module 350 may apply an asymmetric algorithm using the private key output by key module 342, the response output by response module 346, and the verification value output by a previous servant device. More specifically, signature module 350 may append the verification value output by a previous servant device to the response output by response module 346 and apply the asymmetric algorithm to the combination of the verification value output by the previous servant device and the response output by response module 346 using the private key output by key module 342. It should be understood that the response output by response module 346 may be unencrypted (e.g., plaintext) or encrypted by encryption module 348 and/or the response received from the previous servant device may be unencrypted (e.g., plaintext) or encrypted.

Signature module 350 may determine a verification value for servant device 304 based on a key output by key module 342, a response output by response module 346, and a verification value output by a previous servant device. For example, in instances where servant device 304 is an intermediate or last servant device and/or outputting a second or subsequent response to a request for data, signature module 350 may determine a verification value for servant device 304 based on a public key output by key module 342, a response output by response module 346, and a verification value output by a previous servant device. For instance, signature module 350 may apply an asymmetric algorithm using the public key output by key module 342, the response output by response module 346, and the verification value output by a previous servant device. More specifically, signature module 350 may append the verification value output by the previous servant device to the response output by response module 346 and apply the asymmetric algorithm to the combination of the verification value output by the previous servant device and the response output by response module 346 using the public key output by key module 342. It should be understood that the response output by response module 346 may be unencrypted (e.g., plaintext) or encrypted by encryption module 348 and/or the response received from the previous servant device may be unencrypted (e.g., plaintext) or encrypted.

Signature module 350 may verify a response based on a previous signature and a received verification value. For example, signature module 350 may verify a response from servant device 104B with a public key for servant device 104B and a verification value output by servant device 104B. More specifically, for example, signature module 350 may generate a hash value for servant device 104B using the signature received from servant device 104B and a public key for servant device 104B. Signature module 350 may determine whether the response is verified (e.g., trusted) based on a comparison of the verification value output by servant device 104B and the hash value. For example, signature module 350 may determine that the response is verified when the verification value output by servant device 104B corresponds to (e.g., matches) the hash value. Signature module 350 may determine, however, that the response is not verified (e.g., not trusted) when the verification value output by servant device 104B does not correspond to (e.g., matches) the hash value.

Signature module 350 may initiate an error handling process. For example, signature module 350 may output an error message. For instance, in response to determining that the verification value output by servant device 104B does not correspond to (e.g., matches) a hash value for a signature received from servant device 104B, signature module 350 may output an error message to master device 102. In some examples, signature module 350 may invalidate the verification value. For instance, in response to determining that the verification value output by servant device 104B does not correspond to (e.g., matches) a hash value for a signature received from servant device 104B, signature module 350 may refrain from forwarding the data received from servant device 104B to other servant devices 104 and/or to master device 102. In some examples, however, signature module 350 may ignore the error. For instance, in response to determining that the verification value output by servant device 104B does not correspond to (e.g., matches) a hash value for a signature received from servant device 104B, signature module 350 may forward the data received from servant device 104B to other servant devices 104 and/or to master device 102 and rely on master device 102 to detect the error.

In operation, servant device 304 may enroll with master device 102. For example, identifier module 344 may receive, from master device 102, an identifier and key module 342 may output, to master device 102, a key that master device 102 may assign to the identifier. Servant device 304 may receive, from a previous servant device of servant devices 104, a request for data, a first response to the request for data, and authentication information for the first response to the request for data. For example, servant device 304 may receive, from servant device 104B, a request for data, a first response to the request for data, and authentication information for the first response to the request for data. For example, servant device 304 may receive, from servant device 104B. Servant device 304 may generate data for output to master device 102. For example, a sensor of servant device 304 may generate data indicating a temperature at battery cell included in servant device 304.

In those instances where encryption is used and in response to receiving encrypted data and a signature from servant device 104B, servant device 304 may encrypt data generated by response module 346 for output to master device 102. For instance, encryption module 348 may encrypt, using the key, a result of an exclusive OR operation on plaintext data indicating a temperature at battery cell included in servant device 304 and the encrypted data received from servant device 104B. In some examples, servant device 304 may omit one or more encryption techniques and output plaintext data.

Servant device 304 may determine authentication information for the second response based on the authentication information for the first response, the second response, and a key assigned to servant device 304. For example, signature module 350 may apply a symmetric algorithm using the signature for the first response, the second response, and the key assigned to servant device 304 to generate the signature for the second response. In some examples, signature module 350 may generate a signature according to the signature received from servant device 104B, the key, and the encrypted or plaintext data. For instance, signature module 350 may generate a signature according to the signature received from servant device 104B, the key, and the data indicating the temperature at battery cell included in servant device 304. Signature module 350 may apply an asymmetric algorithm using the verification value for the first response, the second response, and the key assigned to servant device 304. Servant device 304 may output at least the authentication information for the second response, the first response, and the second response. For example, servant device 304 may output the encrypted or plaintext data and signature to servant device 104C.

Figure 4:
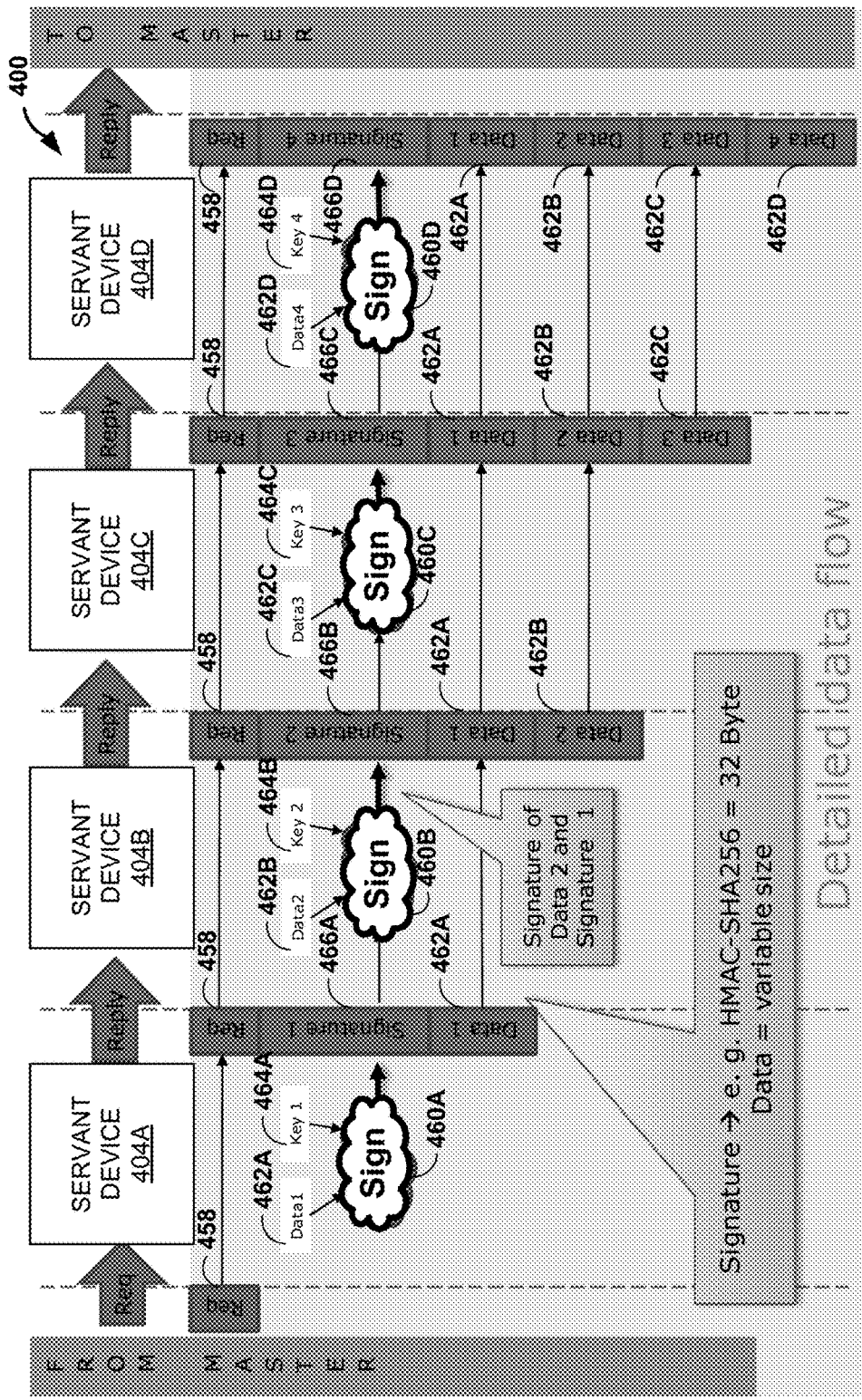
FIG. 4 is an illustration of a first data flow of servant devices arranged in a daisy chain configuration and configured for secured daisy chain communication, in accordance with one or more techniques of this disclosure.

FIG. 4 is an illustration of a first data flow 400 of servant devices arranged in a daisy chain configuration and configured for secured daisy chain communication, in accordance with one or more techniques of this disclosure. For purposes of illustration only, data flow 400 is described below within the context of system 100 of FIG. 1, master device 202 of FIG. 2, and servant device 304 of FIG. 3. Servant devices 404A-D (hereinafter, servant devices 404) may be examples of servant devices 104 of FIG. 1 and/or servant device 304 of FIG. 3.

In response to receiving a request for data 458 from master device 102, servant device 404A generates signature 466A using data 462A and key 464A (460A). Servant device 404A outputs data 462A and signature 466A to servant device 404B. Servant device 404B generates signature 466B using data 462B, key 464B, and signature 466A (460B). Servant device 404B outputs data 462A and B and signature 466B to servant device 404C. Servant device 404C generates signature 466C using data 462C, key 464C, and signature 466B (460C). Servant device 404C outputs data 462A-C and signature 466C to servant device 404D. Servant device 404D generates signature 466D using data 462D, key 464D, and signature 466C (460D). Servant device 404D outputs data 462A-D and signature 466D to master device 102 as a reply to the request received by servant device 440A.

Figure 5:
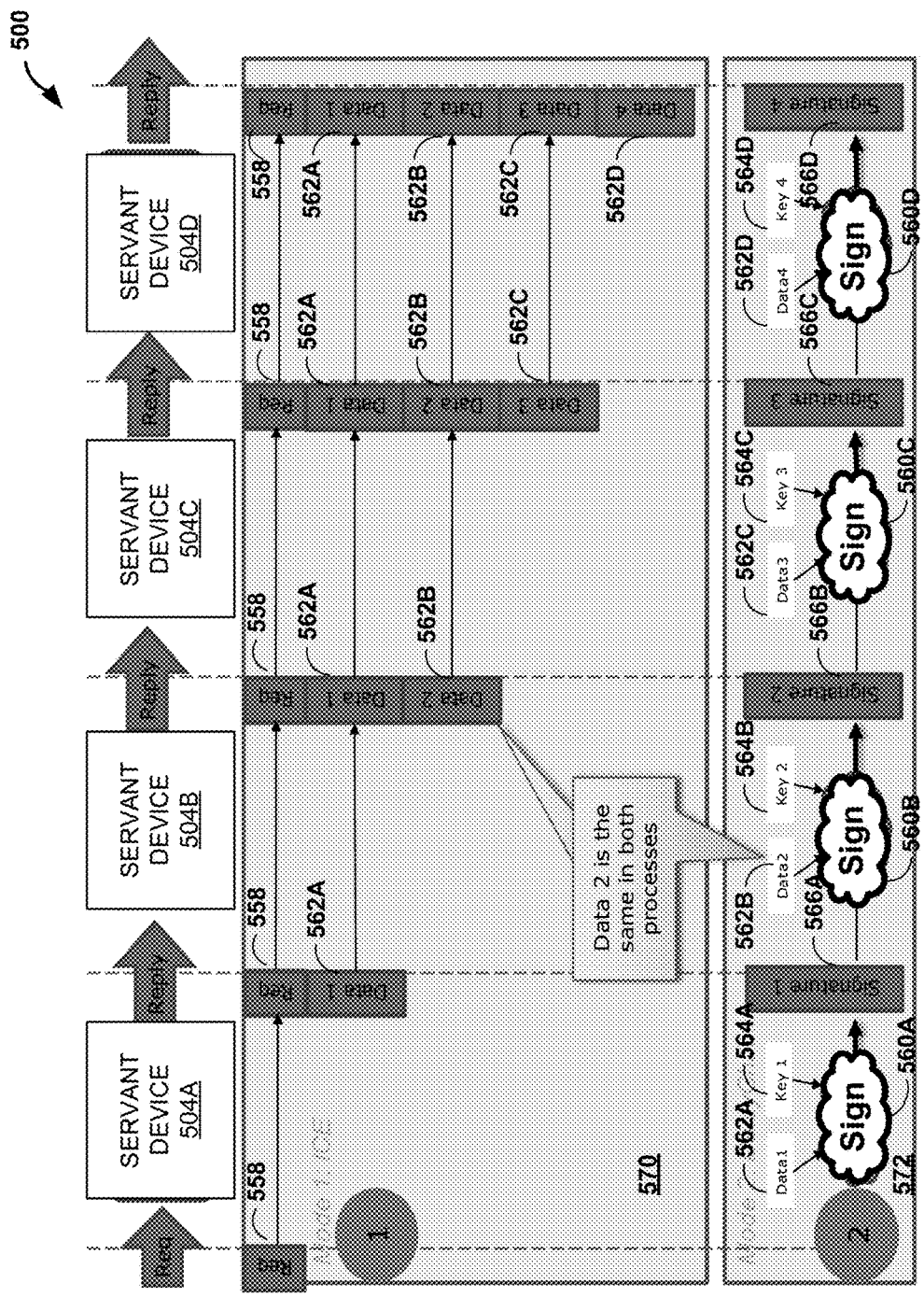
FIG. 5 is an illustration of a second data flow of servant devices arranged in a daisy chain configuration and configured for secured daisy chain communication, in accordance with one or more techniques of this disclosure.

FIG. 5 is an illustration of a second data flow of servant devices arranged in a daisy chain configuration and configured for secured daisy chain communication, in accordance with one or more techniques of this disclosure. For purposes of illustration only, data flow 500 is described below within the context of system 100 of FIG. 1, master device 202 of FIG. 2, and servant device 304 of FIG. 3. Servant devices 504A-D (hereinafter, servant devices 504) may be examples of servant devices 104 of FIG. 1 and/or servant device 304 of FIG. 3.

In response to receiving a request for data 558 from master device 102, servant device 504A outputs, at mode 570, data 568A to servant device 504B. Servant device 504B outputs, at mode 570, data 568A and B to servant device 504C. Servant device 504C outputs, at mode 570, data 568A-C to servant device 504D. Servant device 504D outputs, at mode 570, data 568A-D to master device 102 as a reply to the request received by servant device 504A.

In response to receiving request for data 558 from master device 102, servant device 504A generates signature 566A using data 562A and key 564A (560A). Servant device 504A outputs, at mode 572, signature 566A to servant device 504B. Servant device 504B generates signature 566B using data 562B, key 564B, and signature 566A (560B). Servant device 504B outputs, at mode 572, signature 566B to servant device 504C. Servant device 504C generates signature 566C using data 562C, key 564C, and signature 566B (560C). Servant device 504C outputs, at mode 572, signature 566C to servant device 504D. Servant device 504D generates signature 566D using data 562D, key 564D, and signature 566C (560D). Servant device 504D outputs, at mode 572, signature 566D to master device 102 as a reply to the request received by servant device 504A.

In some examples, modes 570 and 572 may operate independently from each other. For example, servant device 504D may output data 568A-D to master device 102 before outputting signature 566D to master device 102. In some examples, modes 570 and 572 may operate using different hardware. For instance, mode 570 and 572 may operate at different buses. In some examples, modes 570 and 572 may operate using different protocols. In this manner, servant devices 504 may be configured to output data 568A-D to master device 102 in a manner that allows additional time for master device 102 to determine a predicted signature to compare with signature 566.

Figure 6:
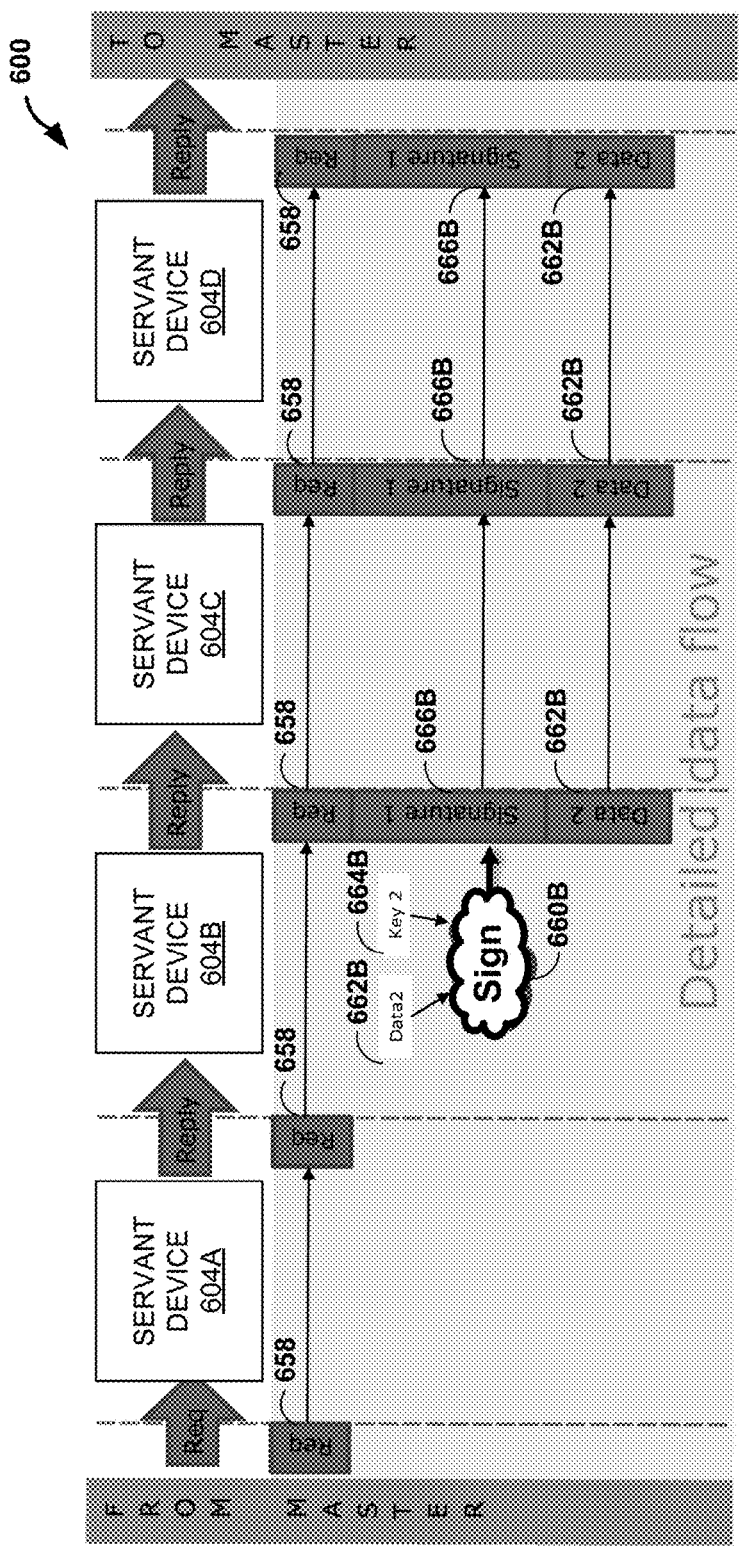
FIG. 6 is an illustration of a third data flow of servant devices arranged in a daisy chain configuration and configured for secured daisy chain communication, in accordance with one or more techniques of this disclosure.

FIG. 6 is an illustration of a third data flow 600 of servant devices arranged in a daisy chain configuration and configured for secured daisy chain communication, in accordance with one or more techniques of this disclosure. For purposes of illustration only, data flow 600 is described below within the context of system 100 of FIG. 1, master device 202 of FIG. 2, and servant device 304 of FIG. 3. Servant devices 604A-D (hereinafter, servant devices 604) may be examples of servant devices 104 of FIG. 1 and/or servant device 304 of FIG. 3.

In response to receiving a request for data 658 from master device 102, servant device 604A determines that request for data 658 does not request a response from servant device 604A and forwards request for data 658 to servant device 604B. Servant device 604B determines that request for data 658 requests a response from servant device 604B. In response to determining that request for data 658 requests a response from servant device 604B, servant device 604B generates data 662B, generates signature 666B using data 662B and key 664B, and forwards request for data 658, data 662B, and signature 666B to servant device 604C. Servant device 604C determines that request for data 658 does not request a response from servant device 604B and forwards request for data 658, data 662B, and signature 666B to servant device 604D. In the above example servant devices 604B-D forward request for data 658, however, in other examples servant devices 604B-D may refrain from forwarding request for data 658 because the request for data 658 is satisfied by data 662B.

Figure 7:
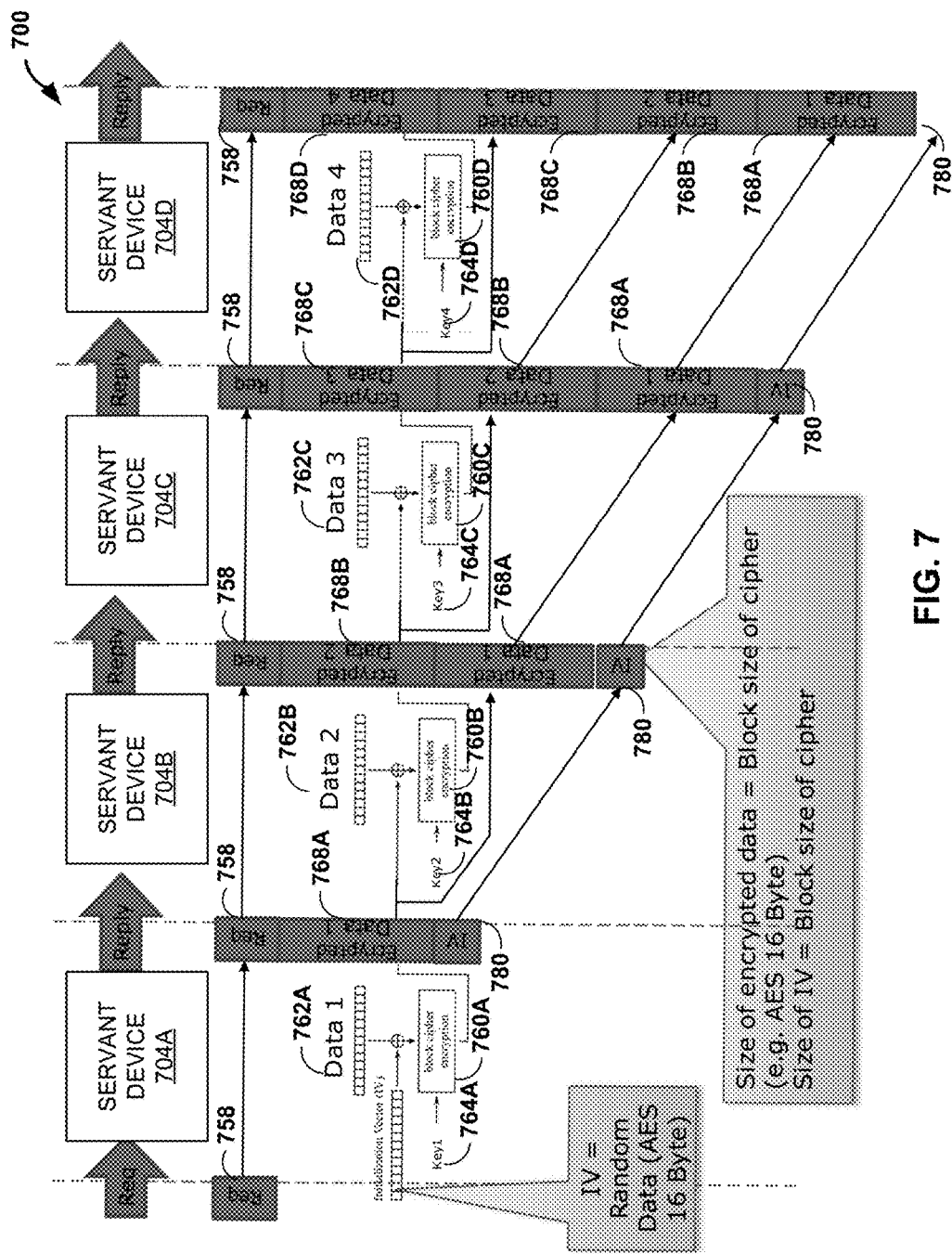
FIG. 7 is an illustration of a fourth data flow of servant devices arranged in a daisy chain configuration and configured for secured daisy chain communication, in accordance with one or more techniques of this disclosure.

FIG. 7 is an illustration of a fourth data flow 700 of servant devices arranged in a daisy chain configuration and configured for secured daisy chain communication, in accordance with one or more techniques of this disclosure. For purposes of illustration only, data flow 700 is described below within the context of system 100 of FIG. 1, master device 202 of FIG. 2, and servant device 304 of FIG. 3. Servant devices 704A-D (hereinafter, servant devices 704) may be examples of servant devices 104 of FIG. 1 and/or servant device 304 of FIG. 3.

In response to receiving a request for data 758 from master device 102, servant device 704A generates initialization vector 780. Servant device 704A generates encrypted data 768A by performing block cipher encryption 760A using key 764A for servant device 704A and a result of an exclusive OR operation on data 762A output by servant device 704A and initialization vector 780. Servant device 704A outputs initialization vector 780 and encrypted data 768A to servant device 704B. Servant device 704B generates encrypted data 768B by performing block cipher encryption 760B using key 764B for servant device 704B and a result of an exclusive OR operation on data 762B output by servant device 704B and encrypted data 768A. Servant device 704B outputs initialization vector 780 and encrypted data 768A and B to servant device 704C. Servant device 704C generates encrypted data 768C by performing block cipher encryption 760C using key 764C for servant device 704C and a result of an exclusive OR operation on data 762C output by servant device 704C and encrypted data 768B. Servant device 704C outputs initialization vector 780 and encrypted data 768A-C to servant device 704D. Servant device 704D generates encrypted data 768D by performing block cipher encryption 760D using key 764D for servant device 704D and a result of an exclusive OR operation on data 762D output by servant device 704D and encrypted data 768C. Servant device 704D outputs initialization vector 780 and encrypted data 768A-D to master device 102 as a reply to request for data 758 received by servant device 704A.

Figure 8:
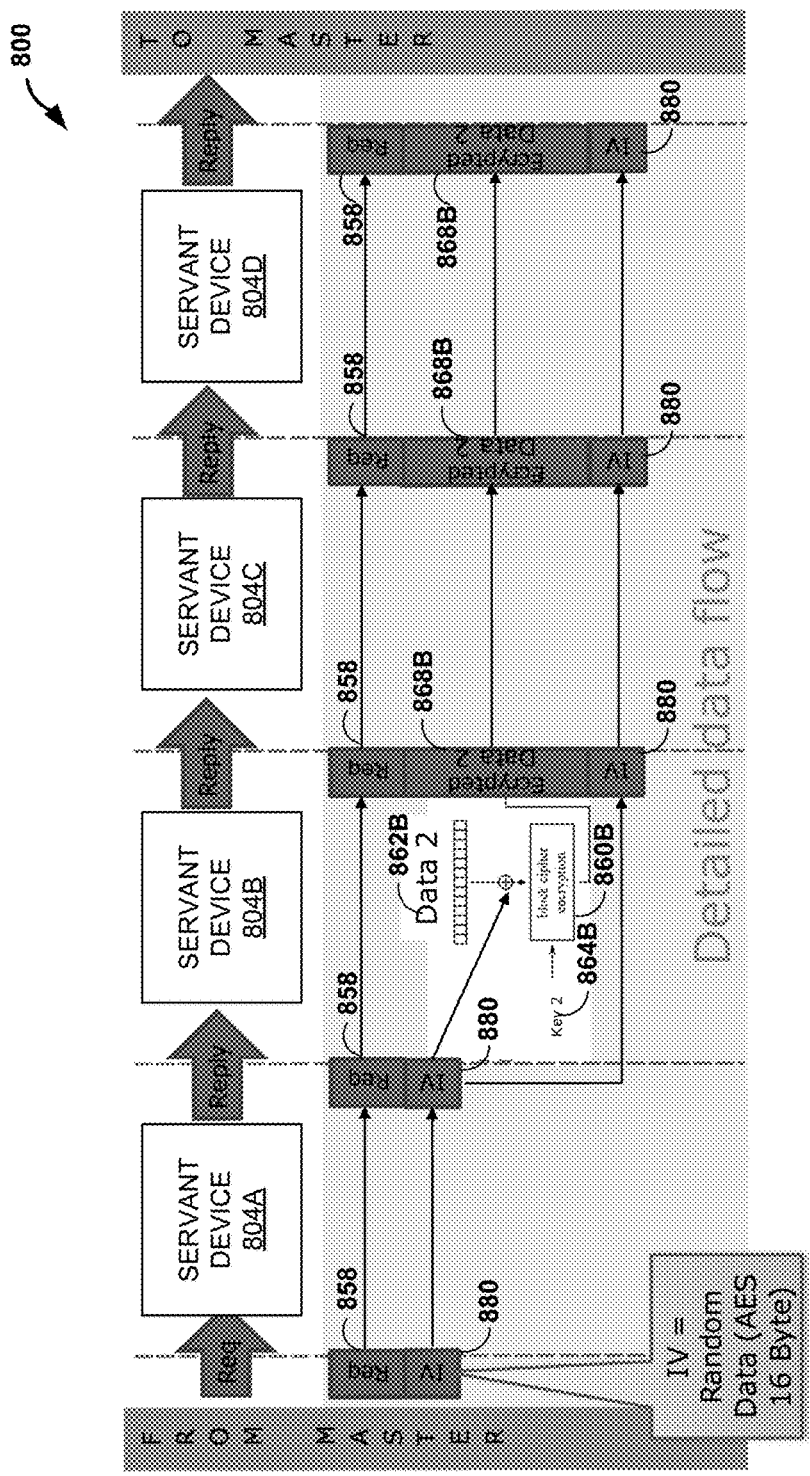
FIG. 8 is an illustration of a fifth data flow of servant devices arranged in a daisy chain configuration and configured for secured daisy chain communication, in accordance with one or more techniques of this disclosure.

FIG. 8 is an illustration of a fifth data flow 800 of servant devices arranged in a daisy chain configuration and configured for secured daisy chain communication, in accordance with one or more techniques of this disclosure. For purposes of illustration only, data flow 800 is described below within the context of system 100 of FIG. 1, master device 202 of FIG. 2, and servant device 304 of FIG. 3. Servant devices 804A-D (hereinafter, servant devices 804) may be examples of servant devices 104 of FIG. 1 and/or servant device 304 of FIG. 3.

Servant device 804A receives request for data 858 and initialization vector 880 from master device 102. In response to determining that request for data 858 does not requests a response from servant device 804A, servant device 804A does not generate a response and forwards request for data 858 and initialization vector 880 to servant device 604B. In response to determining that request for data 858 requests a response from servant device 804B, servant device 804B generates encrypted data 868B by performing block cipher encryption 860B using key 864B for servant device 804B and a result of an exclusive OR operation on data 862B output by servant device 804B and initialization vector 880 and generates signature 866B using data 862B and key 864B. Servant device 804B forwards request for data 858, data 862B, signature 866B, and initialization vector 880 to servant device 804C. In response to determining that request for data 858 does not requests a response from servant device 804B, servant device 804C does not generate a response and forwards request for data 858, data 862B, signature 866B, and initialization vector 880 to servant device 804D. In response to determining that request for data 858 does not requests a response from servant device 804D, servant device 804D does not generate a response and forwards request for data 858, data 862B, signature 866B, and initialization vector 880 to master device 102 as a reply to the request received by servant device 804A. In the above example servant devices 804B-D forward request for data 858, however, in other examples servant devices 804B-D may refrain from forwarding request for data 858 because the request for data 858 is satisfied by data 862B.

Figure 9:
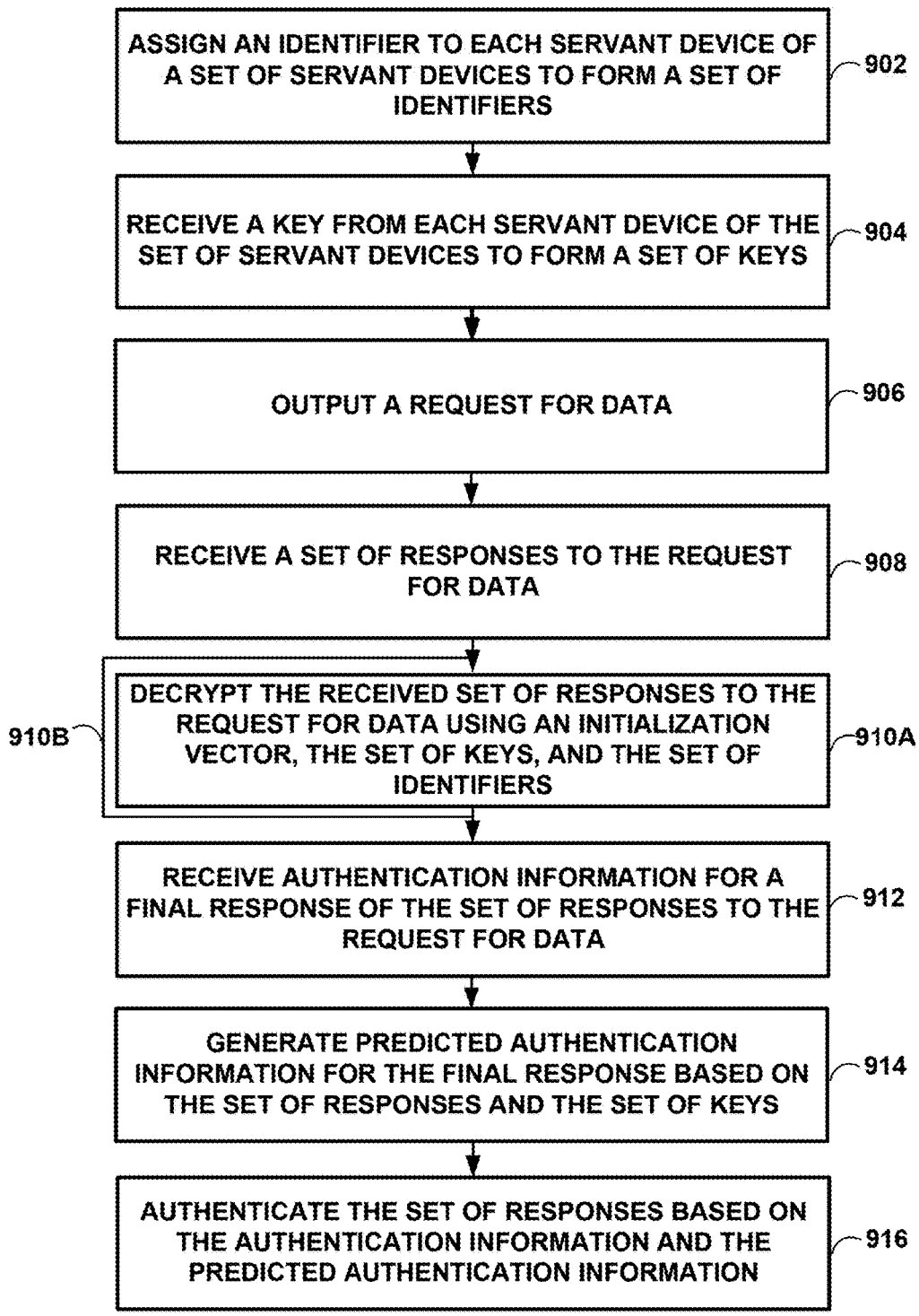
FIG. 9 is a flow diagram consistent with techniques that may be performed by a master device in accordance with this disclosure.

FIG. 9 is a flow diagram consistent with techniques that may be performed by a master device in accordance with this disclosure. For purposes of illustration only, the example operations are described below within the context of system 100 of FIG. 1, master device 202 of FIG. 2, servant device 304 of FIG. 3, data flow 400 of FIG. 4, data flow 500 of FIG. 5, data flow 600 of FIG. 6, data flow 700 of FIG. 7, and data flow 800 of FIG. 8.

In accordance with one or more techniques of this disclosure, identifier module 222 assigns an identifier to each servant device of servant devices 104 to form a set of identifiers (902). Key module 220 receives a key from each servant device of servant devices 104 to form a set of keys (904). Communication module 218 outputs a request for data to servant devices 104 (906). Communication module 218 receives a set of data from servant devices 104 (908).

In some examples, encryption and decryption module 224 may decrypt the set of data using an initialization vector, the set of keys, and the set of identifiers (910A). For example, encryption and decryption module 224 decrypts data from servant device 704A of FIG. 7 using initialization vector 780 of FIG. 7, a key for servant device 704A of FIG. 7, and encrypted data 768A of FIG. 7. In this example, encryption and decryption module 224 decrypts data from servant device 704B using encrypted data 768A, a key for servant device 704B of FIG. 7 and encrypted data 768B of FIG. 7, and so forth until encrypted data 768A-D of FIG. 7 is decrypted. However, in some examples, one or more decryption techniques are omitted (910B).

Master device 202 receives authentication information for a final response of the set of responses to the request for data (912). For example master device 202 may receive a single signature for the final response. Signature module 226 generates predicted authentication information for the final response based on the set of responses and the set of keys (914). For example, signature module 226 may generate signature 466A of FIG. 4 using data 462A of FIG. 4, and key 464A of FIG. 4. In this example, signature module 226 generates signature 466B of FIG. 4 using data 462B of FIG. 4, key 464B of FIG. 4, and signature 466A of FIG. 4, and so forth until signature 466D is determined as the predicted signature for servant devices 104. In some examples, signature module 226 may generate a first verification value for servant device 104A using the a response output by servant device 104A and a public key assigned to an identifier for servant device 104A, a second verification value for servant device 104B using a response output by servant device 104B, a key assigned to an identifier for servant device 104B, and the first verification value for servant device 104A, and so on to generate a final verification value for the servant devices 104.

Authentication module 228 authenticates the set of responses based on the authentication information and the predicted authentication information (916). For example, authentication module 228 authenticates servant devices 104 when the single signature matches the predicted signature. In some examples, authentication module 228 may calculate a verification value for the single signature from servant device 104N using the single signature from servant device 104N and the public key for servant device 104N. In this example, authentication module 228 may authenticate servant device 104N when the final verification value calculated by signature module 226 matches the verification value for the single signature from servant device 104N.

Figure 10:
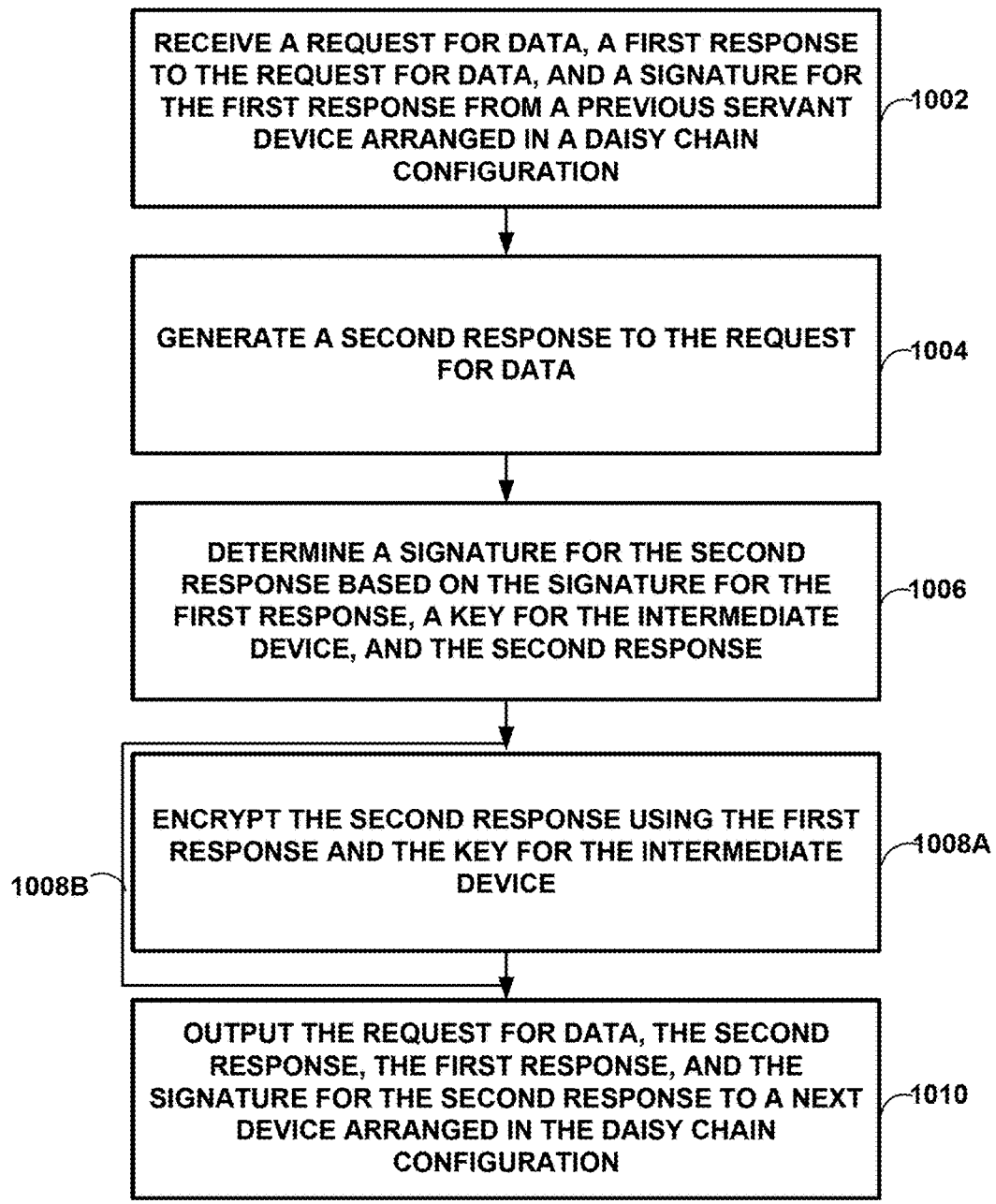
FIG. 10 is a first flow diagram consistent with techniques that may be performed by a servant device in accordance with this disclosure.

FIG. 10 is a first flow diagram consistent with techniques that may be performed by a servant device in accordance with this disclosure. For purposes of illustration only, the example operations are described below within the context of system 100 of FIG. 1, master device 202 of FIG. 2, servant device 304 of FIG. 3, data flow 400 of FIG. 4, data flow 500 of FIG. 5, data flow 600 of FIG. 6, data flow 700 of FIG. 7, and data flow 800 of FIG. 8.

In accordance with one or more techniques of this disclosure, communication module 338 may receive a request for data, a first response to the request for data, and a signature for the first response from a previous device arranged in a daisy chain configuration (1002). For example, servant device 104C may receive a request for data, a first response, and a signature from servant device 104B. Response module 346 may generate a response to the request for data (1004). For example, in response to request module 340 determining that the request for data requests a response from servant device 304, response module 346 generates the response to the request.

Signature module 350 may determine a signature for the second response based on the signature for the first response, a key for the intermediate servant device, and the second response (1006). For example, servant device 404B of FIG. 4 may determine a signature for servant device 404B of FIG. 4 according to signature 466A of FIG. 4, key 464B of FIG. 4, and data 462B of FIG. 4.

In some examples, encryption module 348 may encrypt data for the intermediate servant device using the data received from the previous device and the key for the intermediate servant device (1008A). For example, encryption module 348 of FIG. 3 may generate encrypted data 768B of FIG. 7 using encrypted data 768A of FIG. 7 and a key for servant device 704B of FIG. 7. However, in some examples, one or more decryption techniques are omitted (1008B).

Communication module 338 may output the request for data, the second response, the first response, and the signature for the second response to a next device arranged in the daisy chain configuration (1010). For example, servant device 404B of FIG. 4 may output request for data 458, data 462B of FIG. 4 for servant device 404B of FIG. 4, data 462A of FIG. 4 received from servant device 404A of FIG. 4, and signature 466B of FIG. 4 for servant device 404B of FIG. 4 to servant device 404C of FIG. 4. In some examples, servant device 504B of FIG. 5 may output, at mode 570, request for data 558, data 568B of FIG. 4 for servant device 404B of FIG. 4, and data 462A of FIG. 4 received from servant device 404A of FIG. 4 to servant device 504C of FIG. 5. In this example, servant device 504B may output, at mode 572, signature 566B of FIG. 5 for servant device 504B of FIG. 5 to servant device 504C of FIG. 5.

Figure 11:
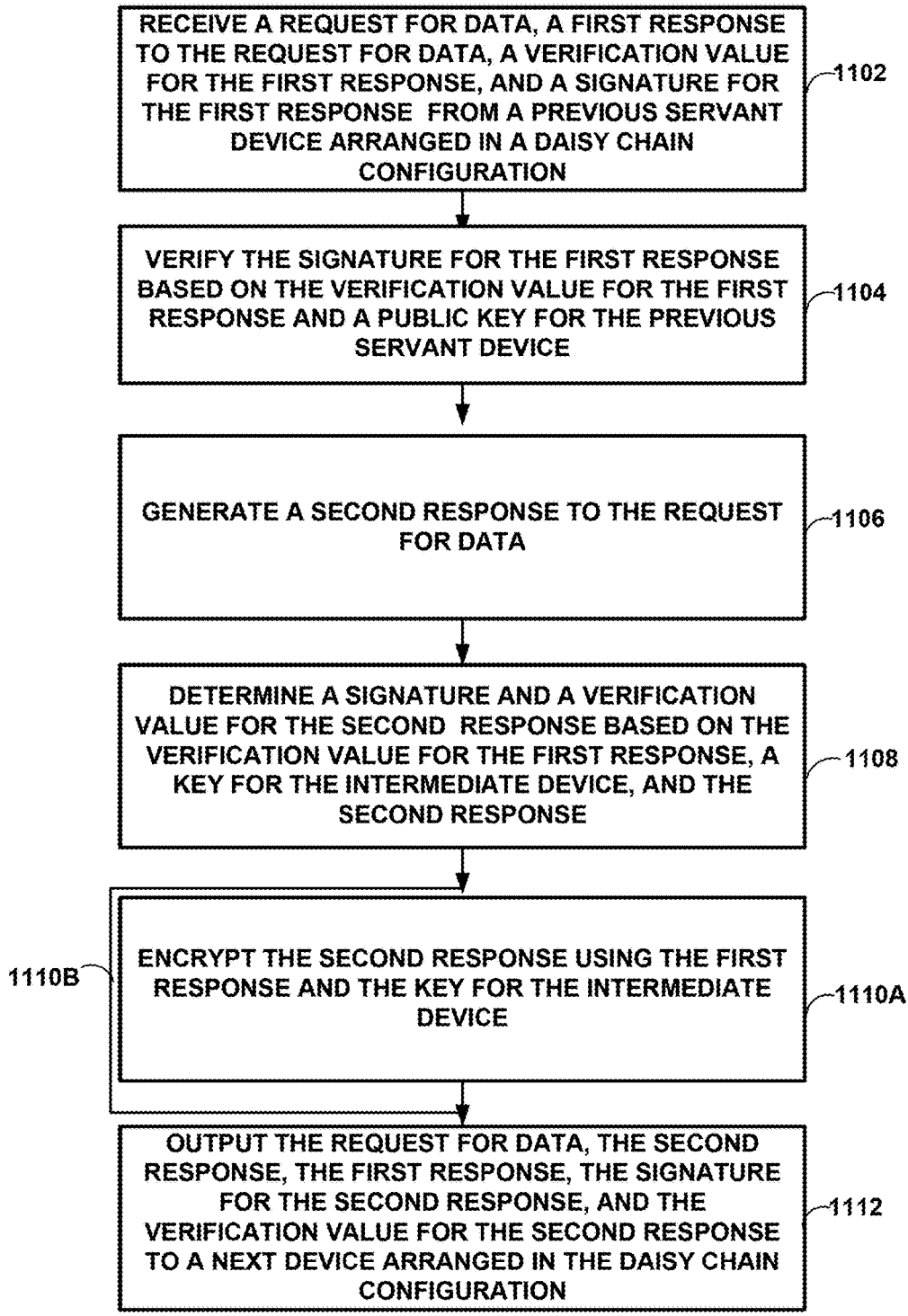
FIG. 11 is a second flow diagram consistent with techniques that may be performed by a servant device in accordance with this disclosure.

FIG. 11 is a second flow diagram consistent with techniques that may be performed by a servant device in accordance with this disclosure. For purposes of illustration only, the example operations are described below within the context of system 100 of FIG. 1, master device 202 of FIG. 2, servant device 304 of FIG. 3, data flow 400 of FIG. 4, data flow 500 of FIG. 5, data flow 600 of FIG. 6, data flow 700 of FIG. 7, and data flow 800 of FIG. 8.

In accordance with one or more techniques of this disclosure, communication module 338 may receive a request for data, a first response to the request for data, a verification value, and a signature for the first response (1102). For example, servant device 104C may receive a request for data, a first response to the request for data, a verification value, and a signature for the first response from servant device 104B. Signature module 350 may verify the signature for the previous device based on the verification value and a public key for the previous device (1104). For example, signature module 350 may generate a verification value using the signature from servant device 104B and a public key for servant device 104B and determine that the signature is verified when the verification value output by servant device 104B corresponds to (e.g., matches) the verification value for servant device 104B that was generated using the signature from servant device 104B and the public key for servant device 104B.

Response module 346 may generate a second response to the request for data (1106). For example, in response to request module 340 determining that the request for data requests a response from servant device 304, response module 346 generates the response to the request.

Signature module 350 may determine a signature and a verification value for the second response based on the verification value for the first response, a key for the intermediate servant device, and the second response (1108). For example, signature module 350 may generate a verification value using a verification value output by servant device 104B, a response output by response module 346, and a public key output by key module 342. In this example, signature module 350 may determine a signature based on a combination of a response output by response module 346, a private key output by key module 342, and the verification value received from servant device 104B.

In some examples, encryption module 348 may encrypt data for the intermediate servant device using the data received from the previous device and the key for the intermediate servant device (1110A). For example, encryption module 348 of FIG. 3 may generate encrypted data 768B of FIG. 7 using encrypted data 768A of FIG. 7 and a key for servant device 704B of FIG. 7. However, in some examples, one or more decryption techniques are omitted (1110B).

Communication module 338 may output the request for data, the second response, the first response, the signature for the second response, and the verification value for the second response to a next device arranged in the daisy chain configuration (1112). For example, servant device 104C may output the request for data, the second response, the first response, the signature for the second response, and the verification value for the second response to servant device 104D.

The following examples may illustrate one or more aspects of the disclosure.

Example 1

An intermediate servant device connected in a daisy chain configuration with a set of devices, wherein the intermediate servant device is configured to: receive, from a previous servant device of the set of servant devices, a request for data, a first response to the request for data, and authentication information for the first response to the request for data; generate a second response to the request for data; determine authentication information for the second response based on the authentication information for the first response, the second response, and a key assigned to the intermediate servant device; and output at least the authentication information for the second response, the first response, and the second response.

Example 2

The intermediate servant device of example 1, wherein the authentication information for the first response includes a signature for the first response and the authentication information for the second response includes a signature for the second response, and wherein to determine the authentication information for the second response, the intermediate servant device is configured to: apply a symmetric algorithm using the signature for the first response, the second response, and the key assigned to the intermediate servant device to generate the signature for the second response.

Example 3

The intermediate servant device of examples 1-2 or a combination thereof, wherein the authentication information for the first response includes a verification value for the first response, wherein the authentication information for the second response includes a verification value for the second response, and wherein to determine the authentication information for the second response, the intermediate servant device is configured to: apply an asymmetric algorithm using the verification value for the first response, the second response, and the key assigned to the intermediate servant device.

Example 4

The intermediate servant device of examples 1-3 or a combination thereof, wherein the key assigned to the intermediate servant device is a public key and wherein the authentication information for the second response further includes a signature for the second response, the intermediate servant device being configured to: generate the signature for the second response using the verification value for the first response and a private key assigned to the intermediate servant device.

Example 5

The intermediate servant device of examples 1-4 or a combination thereof, wherein the authentication information for the first response further includes a signature for the first response, the intermediate servant device being configured to: generate a hash value using the signature for the first response and a public key assigned to the previous servant device; and determine that the first response is verified when the hash value for the first response corresponds to the verification value for the first response.

Example 6

The intermediate servant device of examples 1-5 or a combination thereof, wherein the intermediate servant device is further configured to: output, via a first mode, the first response to the request for data and the second response to the request for data; and output, via a second mode that is different from the first mode, the authentication information for the second response.

Example 7

The intermediate servant device of examples 1-6 or a combination thereof, wherein the first response is an encrypted first response and wherein to generate the second response to the request for data, the servant device is further configured to: encrypt a plain text response to the request for data using the encrypted first response.

Example 8

The intermediate servant device of examples 1-7 or a combination thereof, wherein the intermediate servant device is configured to: generate the second response in response to determining that the request for data indicates a request for data from the intermediate servant device.

Example 9

The intermediate servant device of examples 1-8 or a combination thereof, wherein the intermediate servant device is configured to: output the request for data in response to determining that the request for data indicates a request for data from a next servant device of the set of servant devices.

Example 10

A method comprising: receiving, by an intermediate servant device connected in a daisy chain configuration with a set of servant devices, from a previous device of the set of devices, a request for data, a first response to the request for data, and authentication information for the first response to the request for data; generating, by the intermediate servant device, a second response to the request for data; determining, by the intermediate servant device, authentication information for the second response based on the authentication information for the first response and a key assigned to the intermediate servant device; and outputting, by the intermediate servant device, at least the authentication information for the second response, the first response, and the second response.

Example 11

The method of example 10, wherein the authentication information for the first response includes a signature for the first response and the authentication information for the second response includes a signature for the second response and wherein determining the authentication information for the second response comprises: applying, by the intermediate servant device, a symmetric algorithm using the signature for the first response, the second response, and the key assigned to the intermediate servant device to generate the signature for the second response.

Example 12

The method of examples 10-11 or a combination thereof, wherein the authentication information for the first response includes a verification value for the first response, wherein the authentication information for the second response includes a verification value for the second response, and wherein determining the authentication information for the second response comprises: applying, by the intermediate servant device, an asymmetric algorithm using the verification value for the first response, the second response, and the key assigned to the intermediate servant devices.

Example 13

The method of examples 10-12 or a combination thereof, wherein the key assigned to the intermediate servant device is a public key and wherein the authentication information for the second response further includes a signature for the second response, the method further comprising: generating, by the intermediate servant device, the signature for the second response using the verification value for the first response and a private key assigned to the intermediate servant device.

Example 14

The method of examples 10-13 or a combination thereof, wherein the authentication information for the first response further includes a signature for the first response, the method further comprising: generating, by the intermediate servant device, a hash value using the signature for the first response and a public key assigned to the previous servant device; and determining, by the intermediate servant device, that the first response is verified when the hash value for the first response corresponds to the verification value for the first response.

Example 15

The method of examples 10-14 or a combination thereof, wherein outputting at least the authentication information for the second response, the first response, and the second response comprises: output, by the intermediate servant device, via a first mode, the first response to the request for data and the second response to the request for data; and output, by the intermediate servant device, via a second mode that is different from the first mode, the authentication information for the second response.

Example 16

The method of examples 10-15 or a combination thereof, wherein the first response is an encrypted first response and wherein generating the second response to the request for data comprises: encrypting, by the intermediate servant device, a plain text response to the request for data using the encrypted first response.

Example 17

The method of examples 10-16 or a combination thereof, wherein the intermediate servant device is configured to generate the second response in response to determining that the request for data indicates a request for data from the intermediate servant device.

Example 18

The method of examples 10-17 or a combination thereof, further comprising: outputting, by the intermediate servant device, the request for data in response to determining that the request for data indicates a request for data from a next servant device of the set of servant devices.

Example 19

A system comprising: a master device configured to output a request for data; a set of servant devices arranged in a daisy chain configuration such that an initial servant device of the set of servant devices receives the request for data from the master device and a last servant device of the set of servant devices outputs one or more responses to the request for data to the master device, wherein an intermediate servant device of the set of servant devices that is arranged in the daisy chain configuration between the initial servant device and the last servant device is configured to: receive, from a previous servant device of the set of servant devices, the request for data, a first response to the request for data, and authentication information for the first response; generate a second response to the request for data; determine authentication information for the second response based on the authentication information for the first response and a key assigned to the servant device; and output, to a next servant device of the set of servant devices, at least the authentication information for the second response, the first response, and the second response.

Example 20

The system of example 19, wherein the intermediate servant device includes an energy storage device and wherein the intermediate servant device is configured to generate the second response to the request for data based on a detected characteristic of the energy storage device.

Example 21

The system of examples 19-20 or a combination thereof, wherein the intermediate servant device includes a sensor and wherein the intermediate servant device is configured to generate the second response to the request for data based on an output of the sensor.

Example 22

The system of examples 19-21 or a combination thereof, wherein the intermediate servant device includes an actuator and wherein the intermediate servant device is configured to generate the second response to the request for data based on a detected characteristic of the actuator.

Example 23

A master device connected to a set of servant devices that are arranged in a daisy chain configuration, wherein the master device is configured to: output, to an initial servant device of the set of servant devices, a request for data; receive, from a last servant device of the set of servant devices, a set of responses to the request for data and authentication information for a final response of the set of responses; determine, for a first response of the set of responses, authentication information for the first response based on the first response and a key assigned to a servant device of the set of servant devices that outputted the first response; determine, for each other response of the set of responses including the final response, respective authentication information based on authentication information from a previous response of the set of responses, a respective response of the set of responses, and a key assigned to a servant device of the set of servant devices that outputted the respective response to generate predicted authentication information for the final response; and authenticate the set of responses based on the predicted authentication information and the received authentication information for the final response.

Example 24

The master device of example 23, wherein the authentication information for the final response includes a single signature for the final response, wherein the predicted authentication information includes a predicted signature, and wherein to authenticate the set of responses, the master device is configured to: authenticate the set of responses when the predicted signature corresponds to the single signature for the final response.

Example 25

The master device of examples 23-24 or a combination thereof, wherein the authentication information for the final response includes a single signature for the final response, wherein the predicted authentication information includes a predicted verification value, and wherein to authenticate the set of responses, the master device is configured to: generate a hash value using the single signature for the final response and a public key assigned to a servant device of the set of servant devices that outputted the final response; and authenticate the set of responses when the predicted verification value corresponds to the hash value.

Example 26

The master device of examples 23-25 or a combination thereof, wherein each response of the set of responses includes a respective identifier that defines one servant device of the set of servant devices and wherein the master device is further configured to: determine, for each response of the set of responses, a respective key based on a respective identifier.

Example 27

The master device of examples 23-26 or a combination thereof, wherein to output the request for data, the master device is configured to: output the request for data such that the request for data indicates a set of addresses, wherein each address of the set of addresses defines one servant device of the set of servant devices.

Example 28

The master device of examples 23-27 or a combination thereof, wherein to output the request for data, the master device is configured to: output the request for data such that the request for data indicates a set of parameter values, wherein each respective parameter value of the set of parameter values defines whether a response is requested from a servant device of the set of servant devices assigned to the respective parameter value.

Example 29

The master device of examples 23-28 or a combination thereof, wherein the master device is configured to: output, to the initial servant device, a set of requests for data, the set of requests for data including the request for data, wherein an order of the set of requests for data defines a servant device of the set of servant devices for each respective request for data of the set of requests for data.

Example 30

The master device of examples 23-29 or a combination thereof, wherein to receive the set of responses to the request for data and the authentication information for the final response, the master device is configured to: receive, via a first mode, the set of responses to the request for data; and receive, via a second mode that is different from the first mode, the authentication information for the final response.

Example 31

The master device of examples 23-30 or a combination thereof, wherein the set of responses is an encrypted set of responses, the master device being configured to: decrypt the set of responses to determine a set of plain text responses to the request for data.

Example 32

A method comprising: outputting, by a master device, to an initial servant device of a set of servant devices that are arranged in a daisy chain configuration, a request for data; receiving, by the master device, from a last servant device of the set of servant devices, a set of responses to the request for data and authentication information for a final response of the set of responses; determining, by the master device, for a first response of the set of responses, authentication information for the first response based on the first response and a key assigned to a servant device of the set of servant devices that outputted the first response; determining, by the master device, for each other response of the set of responses including the final response, respective authentication information based on authentication information from a previous response of the set of responses, a respective response of the set of responses, and a key assigned to a servant device of the set of servant devices that outputted the respective response to generate predicted authentication information for the final response; and authenticating, by the master device, the set of responses based on the predicted authentication information and the received authentication information for the final response.

Example 33

The method of example 32, wherein the authentication information for the final response includes a single signature for the final response, wherein the predicted authentication information includes a predicted signature, and authenticating the set of responses comprises: authenticating, by the master device, the set of responses when the predicted signature corresponds to the single signature for the final response.

Example 34

The method of examples 32-33 or a combination thereof, wherein the authentication information for the final response includes a single signature for the final response, wherein the predicted authentication information includes a predicted verification value, and authenticating the set of responses comprises: generating, by the master device, a hash value using the single signature for the final response and a public key assigned to a servant device of the set of servant devices that outputted the final response; and authenticating, by the master device, the set of responses when the predicted verification value corresponds to the hash value.

Example 35

The method of examples 32-34 or a combination thereof, wherein each response of the set of responses includes a respective identifier that defines one servant device of the set of servant devices, the method further comprising: determining, by the master device, for each response of the set of responses, a respective key based on a respective identifier.

Example 36

The method of examples 32-35 or a combination thereof, wherein outputting the request for data comprises: outputting, by the master device, the request for data such that the request for data indicates a set of addresses, wherein each address of the set of addresses defines one servant device of the set of servant devices.

Example 37

The method of examples 32-36 or a combination thereof, wherein outputting the request for data comprises: outputting, by the master device, the request for data such that the request for data indicates a set of parameter values, wherein each respective parameter value of the set of parameter values defines whether a response is requested from a servant device of the set of servant devices assigned to the respective parameter value.

Example 38

The method of examples 32-37 or a combination thereof, wherein outputting the request for data comprises: outputting, by the master device, to the initial servant device, a set of requests for data, the set of requests for data including the request for data, wherein an order of the set of requests for data defines a servant device of the set of servant devices for each respective request for data of the set of requests for data.

Example 39

The method of examples 32-38 or a combination thereof, wherein receiving the set of responses to the request for data and the authentication information for the final response comprises: receiving, by the master device, via a first mode, the set of responses to the request for data; and receiving, by the master device, via a second mode that is different from the first mode, the authentication information for the final response.

Example 40

The method of examples 32-39 or a combination thereof, wherein the set of responses is an encrypted set of responses, the method further comprises: decrypting, by the master device, the set of responses to determine a set of plain text responses to the request for data.

Example 41

A system comprising: a set of servant devices arranged in a daisy chain configuration; and a master device connected to the set of servant devices, the master device being configured to: output, to an initial servant device of the set of servant devices, a request for data; receive, from a last servant device of the set of servant devices, a set of responses to the request for data and authentication information for a final response of the set of responses; determine, for a first response of the set of responses, authentication information for the first response based on the first response and a key assigned to a servant device that outputted the first response; determine, for each next response of the set of responses including the final response, respective authentication information based on authentication information from a previous response of the set of responses, a respective response of the set of responses, and a key assigned to a servant device of the set of servant devices that outputted the respective response to generate predicted authentication information; and authenticate the set of responses based on the predicted authentication information and the received authentication information for the final response.

Example 42

The system of example 41, wherein a servant device of the set of servant devices includes an energy storage device and wherein the servant device is configured to generate a response to the request for data based on a detected characteristic of the energy storage device.

Example 43

The system of examples 41-42 or a combination thereof, wherein a servant device of the set of servant devices includes a sensor and wherein the servant device is configured to generate a response to the request for data based on an output of the sensor.

Example 44

The system of examples 41-43 or a combination thereof, wherein the servant device of the set of servant devices includes an actuator and wherein the servant device is configured to generate a response to the request for data based on a detected characteristic of the actuator.

In one or more examples, the functions being performed described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this way, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects have been described in this disclosure. These and other aspects are within the scope of the following claims.

The invention claimed is:

1. An intermediate servant device connected in a daisy chain configuration with a set of servant devices, wherein the intermediate servant device comprises hardware configured to:
receive, from a previous servant device of the set of servant devices, a request for data, a first response to the request for data, and authentication information for the first response to the request for data;
verify the authentication information for the first response;
generate a second response to the request for data;
determine authentication information for the second response based on the authentication information for the first response, the second response, and a key assigned to the intermediate servant device, wherein the authentication information for the first response includes a signature for the first response and wherein the authentication information for the second response includes a signature for the second response;
encrypt the second response using the first response and the key assigned to the intermediate servant device; and
output, to a next servant device arranged in the daisy chain configuration, at least the authentication information for the second response, the first response, and the encrypted second response.

2. The intermediate servant device of claim 1, wherein to determine the authentication information for the second response, the intermediate servant device is configured to:
apply a symmetric algorithm using the signature for the first response, the second response, and the key assigned to the intermediate servant device to generate the signature for the second response.

3. The intermediate servant device of claim 1, wherein the authentication information for the first response includes a verification value for the first response, wherein the authentication information for the second response includes a verification value for the second response, and wherein to determine the authentication information for the second response, the intermediate servant device is configured to:
apply an asymmetric algorithm using the verification value for the first response, the second response, and the key assigned to the intermediate servant device.

4. The servant device of claim 3, wherein the key assigned to the intermediate servant device is a public key, the intermediate servant device being configured to:
generate the signature for the second response using the verification value for the first response and a private key assigned to the intermediate servant device.

5. The servant device of claim 4, the intermediate servant device being configured to:
generate a hash value using the signature for the first response and a public key assigned to the previous servant device; and
determine that the first response is verified when the hash value for the first response corresponds to the verification value for the first response.

6. The intermediate servant device of claim 1, wherein the intermediate servant device is further configured to:
output, via a first mode, the first response to the request for data and the second response to the request for data; and
output, via a second mode that is different from the first mode, the authentication information for the second response.

7. The intermediate servant device of claim 1, wherein the first response is an encrypted first response and wherein to encrypt the second response, the servant device is further configured to:
encrypt a plain text response to the request for data using the encrypted first response.

8. The intermediate servant device of claim 1, wherein the intermediate servant device is configured to:
generate the second response in response to determining that the request for data indicates a request for data from the intermediate servant device.

9. The intermediate servant device of claim 1, wherein the intermediate servant device is configured to:
output the request for data in response to determining that the request for data indicates a request for data from the next servant device.

10. A method comprising:
receiving, by an intermediate servant device connected in a daisy chain configuration with a set of servant devices, from a previous device of the set of devices, a request for data, a first response to the request for data, and authentication information for the first response to the request for data;
verifying, by the intermediate servant device, the authentication information for the first response;
generating, by the intermediate servant device, a second response to the request for data;
determining, by the intermediate servant device, authentication information for the second response based on the authentication information for the first response and a key assigned to the intermediate servant device, wherein the authentication information for the first response includes a signature for the first response and wherein the authentication information for the second response includes a signature for the second response;
encrypting, by the intermediate servant device, the second response using the first response and the key assigned to the intermediate servant device; and
outputting, by the intermediate servant device, to a next servant device arranged in the daisy chain configuration, at least the authentication information for the second response, the first response, and the encrypted second response.

11. The method of claim 10, wherein determining the authentication information for the second response comprises:
applying, by the intermediate servant device, a symmetric algorithm using the signature for the first response, the second response, and the key assigned to the intermediate servant device to generate the signature for the second response.

12. The method of claim 10, wherein the authentication information for the first response includes a verification value for the first response, wherein the authentication information for the second response includes a verification value for the second response, and wherein determining the authentication information for the second response comprises:
applying, by the intermediate servant device, an asymmetric algorithm using the verification value for the first response, the second response, and the key assigned to the intermediate servant devices.

13. The method of claim 12, wherein the key assigned to the intermediate servant device is a public key, the method further comprising:
generating, by the intermediate servant device, the signature for the second response using the verification value for the first response and a private key assigned to the intermediate servant device.

14. The method of claim 13, the method further comprising:
generating, by the intermediate servant device, a hash value using the signature for the first response and a public key assigned to the previous servant device; and
determining, by the intermediate servant device, that the first response is verified when the hash value for the first response corresponds to the verification value for the first response.

15. The method of claim 10, wherein outputting at least the authentication information for the second response, the first response, and the second response comprises:
output, by the intermediate servant device, via a first mode, the first response to the request for data and the second response to the request for data; and
output, by the intermediate servant device, via a second mode that is different from the first mode, the authentication information for the second response.

16. The method of claim 10, wherein the first response is an encrypted first response and wherein encrypting the second response comprises:
encrypting, by the intermediate servant device, a plain text response to the request for data using the encrypted first response.

17. The method of claim 10, wherein the intermediate servant device is configured to generate the second response in response to determining that the request for data indicates a request for data from the intermediate servant device.

18. The method of claim 10, further comprising:
outputting, by the intermediate servant device, the request for data in response to determining that the request for data indicates a request for data from the next servant device.

19. A system comprising:
a master device configured to output a request for data; and
a set of servant devices arranged in a daisy chain configuration such that an initial servant device of the set of servant devices receives the request for data from the master device and a last servant device of the set of servant devices outputs one or more responses to the request for data to the master device, wherein an intermediate servant device of the set of servant devices that is arranged in the daisy chain configuration between the initial servant device and the last servant device is configured to:
receive, from a previous servant device of the set of servant devices, the request for data, a first response to the request for data, and authentication information for the first response;
verify the authentication information for the first response;
generate a second response to the request for data;
determine authentication information for the second response based on the authentication information for the first response and a key assigned to the intermediate servant device, wherein the authentication information for the first response includes a signature for the first response and wherein the authentication information for the second response includes a signature for the second response;
encrypt the second response using the first response and the key assigned to the intermediate servant device; and
output, to a next servant device of the set of servant devices, at least the authentication information for the second response, the first response, and the encrypted second response.

20. The system of claim 19, wherein the intermediate servant device includes an energy storage device and wherein the intermediate servant device is configured to generate the second response to the request for data based on a detected characteristic of the energy storage device.

21. The system of claim 19, wherein the intermediate servant device includes a sensor and wherein the intermediate servant device is configured to generate the second response to the request for data based on an output of the sensor.

22. The system of claim 19, wherein the intermediate servant device includes an actuator and wherein the intermediate servant device is configured to generate the second response to the request for data based on a detected characteristic of the actuator.

* * * * *